United States Patent
Takayanagi et al.

(10) Patent No.: US 9,841,272 B2
(45) Date of Patent: Dec. 12, 2017

(54) FILM THICKNESS MEASURING DEVICE AND FILM THICKNESS MEASURING METHOD

(71) Applicant: TOYOTA JIDOSHA KABUSHIKI KAISHA, Toyota-shi (JP)

(72) Inventors: Jun Takayanagi, Nagoya (JP); Hideyuki Ohtake, Kariya (JP); Hideyuki Aikyo, Kariya (JP); Yasunari Fujisawa, Toyota (JP); Atsuo Nabeshima, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 80 days.

(21) Appl. No.: 14/847,208

(22) Filed: Sep. 8, 2015

(65) Prior Publication Data

US 2016/0069673 A1 Mar. 10, 2016

(30) Foreign Application Priority Data

Sep. 9, 2014 (JP) .................................. 2014-182859

(51) Int. Cl.
*G01B 11/06* (2006.01)

(52) U.S. Cl.
CPC ................................ *G01B 11/0641* (2013.01)

(58) Field of Classification Search
CPC ............................................... G01B 11/0641
See application file for complete search history.

(56) References Cited

U.S. PATENT DOCUMENTS

| 5,434,411 A | * | 7/1995 | Miyahara | ............. | G01N 21/552 250/339.07 |
| 2006/0231762 A1 | * | 10/2006 | Ohtake | ................ | G01N 21/552 250/341.8 |
| 2010/0090112 A1 | | 4/2010 | Kawada et al. | | |

(Continued)

FOREIGN PATENT DOCUMENTS

| CN | 102016548 A | 4/2011 |
| CN | 102770750 A | 11/2012 |

(Continued)

OTHER PUBLICATIONS

Mohammad Neshat et al. "Terahertz time-domain spectroscopic ellipsometry: instrumentation and calibration", Optics express 29063-29075, vol. 20, No. 27, 2012, 13 pages.

*Primary Examiner* — David Porta
*Assistant Examiner* — Jeremy S Valentiner
(74) *Attorney, Agent, or Firm* — Oblon, McClelland, Maier & Neustadt, L.L.P.

(57) ABSTRACT

A film thickness measuring device including: a terahertz wave generator; a prism that has an entrance surface, an abutment surface capable of abutting a surface of a sample including a first film on a side where the first film is formed, and an emission surface; a terahertz wave detector that detects an S-polarization component and a P-polarization component of a reflected wave from the sample, emitted from the emission surface of the prism; and a control section configured to determine a thickness of the first film formed in the sample, based on a difference between a time waveform of the S-polarization component of the reflected wave and a time waveform of the P-polarization component of the reflected wave.

9 Claims, 19 Drawing Sheets

(56) References Cited

U.S. PATENT DOCUMENTS

| | | | |
|---|---|---|---|
| 2011/0249253 A1 | 10/2011 | Nakanishi et al. | |
| 2012/0326037 A1* | 12/2012 | Ohtake | G01B 11/0633 250/338.1 |
| 2015/0076354 A1* | 3/2015 | Koizumi | G01N 21/3586 250/341.8 |
| 2015/0129768 A1* | 5/2015 | Koizumi | G01N 21/3581 250/341.1 |

FOREIGN PATENT DOCUMENTS

| | | |
|---|---|---|
| EP | 1 630 542 A1 | 3/2006 |
| EP | 2 072 997 A1 | 6/2009 |
| EP | 2 273 254 A1 | 1/2011 |
| EP | 2 538 200 A1 | 12/2012 |
| JP | 2004-28618 | 1/2004 |
| JP | 2007-527999 | 10/2007 |
| JP | 2011-196990 | 10/2011 |
| JP | 2013-228330 | 11/2013 |
| WO | WO 2005/085807 A1 | 9/2005 |

\* cited by examiner

F I G . 16
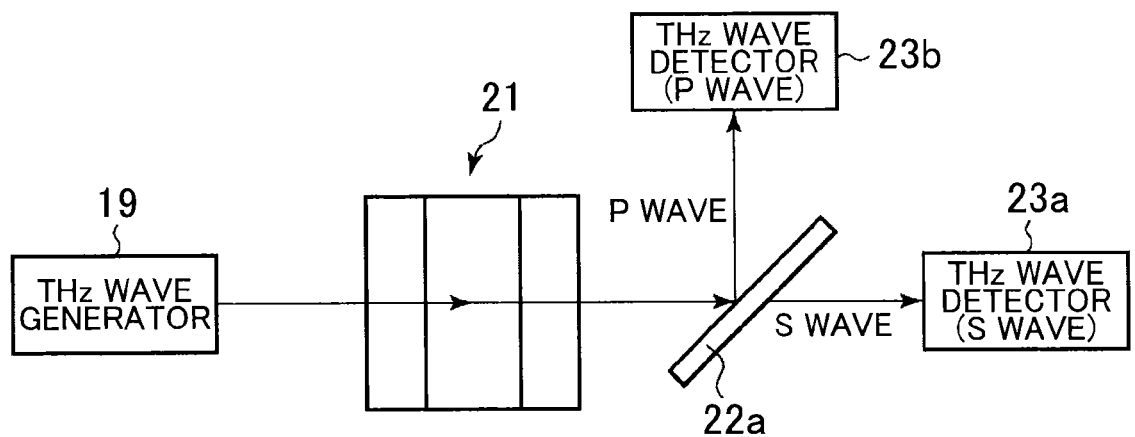

ical significance of exemplary embodiments of the invention will be described below with reference to the accompanying drawings...

FILM THICKNESS MEASURING DEVICE AND FILM THICKNESS MEASURING METHOD

INCORPORATION BY REFERENCE

The disclosure of Japanese Patent Application No. 2014-182859 filed on Sep. 9, 2014 including the specification, drawings and abstract is incorporated herein by reference in its entirety.

BACKGROUND OF THE INVENTION

1. Field of the Invention

The invention relates to a film thickness measuring device and a film thickness measuring method.

2. Description of Related Art

Many industrial products are coated with multi-layer films. The individual multi-layer films have various functions such as rust prevention, adhesion attainment, chipping prevention, coloring, glossing, heat protection, and wear resistance attainment. In order to ensure these functions, it is necessary to accurately grasp the thickness of each layer. To cope with this, a technique for measuring the thickness of each layer of the multi-layer film nondestructively is proposed. Recently, a technique for measuring the thickness of each layer of the multi-layer film by using a terahertz wave is also proposed (Japanese Patent Application Publication No. 2011-196990 (JP 2011-196990 A)).

However, in the case where a film that causes dispersion or absorption of the terahertz wave is included in the multi-layer film, it is difficult to accurately measure the thickness of a film present below the film that causes the dispersion or absorption of the terahertz wave.

SUMMARY OF THE INVENTION

The invention provides a film thickness measuring device and a film thickness measuring method capable of measuring the film thickness more accurately and reliably.

A first aspect of the invention relates to a film thickness measuring device including: a terahertz wave generator that generates a terahertz wave; a prism that has an entrance surface through which the terahertz wave emitted from the terahertz wave generator is caused to enter, an abutment surface capable of abutting a surface of a sample including a first film on a side where the first film is formed, and an emission surface from which a reflected wave from the sample is emitted; a terahertz wave detector that detects an S-polarization component and a P-polarization component of the reflected wave emitted from the emission surface of the prism; and a control section configured to determine a thickness of the first film formed in the sample, based on a difference between a time waveform of the S-polarization component of the reflected wave and a time waveform of the P-polarization component of the reflected wave.

A second aspect of the invention relates to a film thickness measuring method including: causing an abutment surface of a prism to abut a surface of a sample including a first film on a side where the first film is formed, the prism having an entrance surface through which a terahertz wave emitted from a terahertz wave generator is caused to enter, the abutment surface, and an emission surface from which a reflected wave from the sample is emitted; detecting an S-polarization component and a P-polarization component of the reflected wave emitted from the emission surface of the prism using a terahertz wave detector; and determining a thickness of the first film formed in the sample, based on a difference between a time waveform of the S-polarization component of the reflected wave and a time waveform of the P-polarization component of the reflected wave.

According to the invention, the terahertz wave is applied to the sample via the prism, and hence it is possible to cause the terahertz wave to enter the sample at a relatively large incident angle. Since it is possible to cause the terahertz wave to enter the sample at the relatively large incident angle, it is possible to make a significant difference between the time waveform of the S-polarization component in the reflected wave and the time waveform of the P-polarization component in the reflected wave. As a result, according to the embodiment, it is possible to measure the film thickness based on the difference between the time waveform of the S-polarization component in the reflected wave and the time waveform of the P-polarization component in the reflected wave more accurately and reliably.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 16 is a plan view showing part of the film thickness measuring device according to a ninth modification of the embodiment;

DETAILED DESCRIPTION OF EMBODIMENTS

Figure 18A:
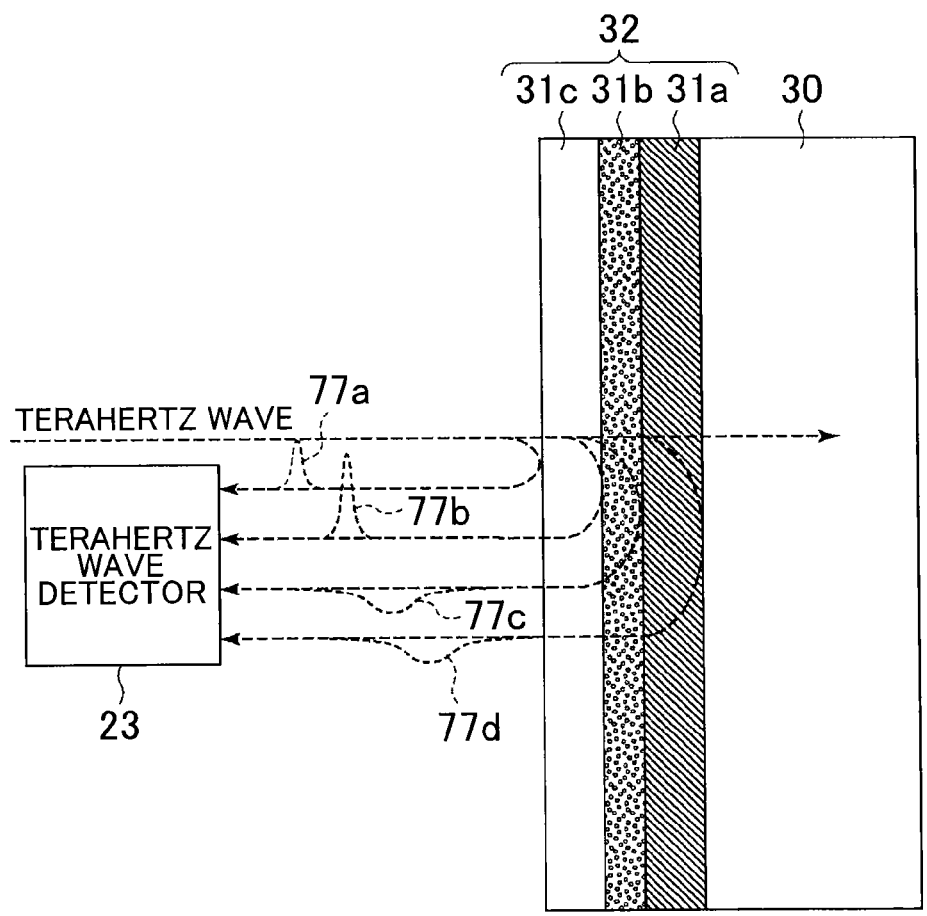
FIGS. 18A and 18B are views each showing a reflected wave when the terahertz wave is applied to the sample.
Figure 18B:
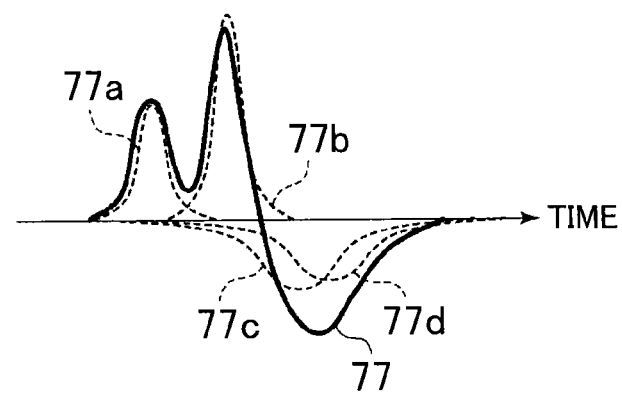

FIGS. 18A and 18B are views each showing a reflected wave when a terahertz wave is applied to a sample. FIG. 18A is a view conceptually showing the reflected waves from individual layers, while FIG. 18B is a view showing a waveform in which the reflected waves from the individual layers are combined. A sample 30 is formed with a multi-layer film 32 having, e.g., a three-layer structure. A film 31$a$ as the first layer is, e.g., a conductive primer layer. A film 31$b$ as the second layer is, e.g., a metallic base layer. A film 31$c$ as the third layer is, e.g., a clear layer. In the case where the terahertz wave is applied to the sample 3, reflected waves from four interfaces reach a terahertz wave detector 23. Since the sufficiently short terahertz wave is applied, the pulse width of a reflected wave 77$a$ on the surface of the film 31$c$ as the third layer becomes sufficiently short. In addition, the pulse width of a reflected wave 77$b$ at an interface between the film 31$c$ as the third layer and the film 31$b$ as the second layer also becomes sufficiently short. However, the film 31$b$ as the second layer is the metallic base layer, and the metallic base layer contains a conductive particle as a particle having conductivity, more specifically a metal particle. Since the metallic base layer contains the conductive particle, in the film 31$b$ as the second layer, dispersion or absorption of the terahertz wave occurs, and the pulse width of the terahertz wave is increased. Accordingly, the pulse width of a reflected wave 77$c$ at an interface between the film 31$b$ as the second layer and the film 31$a$ as the first layer becomes large. In addition, the terahertz wave having the increased pulse width enters the film 31$a$ as the first layer, and hence the pulse width of a reflected wave 77$d$ at an interface between the film 31$a$ as the first layer and a base material 30 becomes large. In the terahertz wave detector 23, a waveform 77 in which the reflected waves 77$a$ to 77$d$ are combined is detected and, as can be seen from FIG. 18B, it is difficult to distinguish between the peak of the reflected wave 77$c$ and the peak of the reflected wave 77$d$. Consequently, in the case where the film 31$b$ that causes the dispersion or absorption of the terahertz wave is present in the multi-layer film 32, it is difficult to accurately measure the thickness of the film 31$b$ and the thickness of the film 31$a$ positioned below the film 31$b$.

Hereinbelow, with reference to the drawings, an embodiment of the invention will be described. Note that the invention is not limited to the embodiment, and the embodiment can be changed as appropriate within the scope of the invention. In the drawings described below, components having the same function are denoted by the same reference numeral, and the repeated description thereof will be omitted in some cases.

Figure 1:
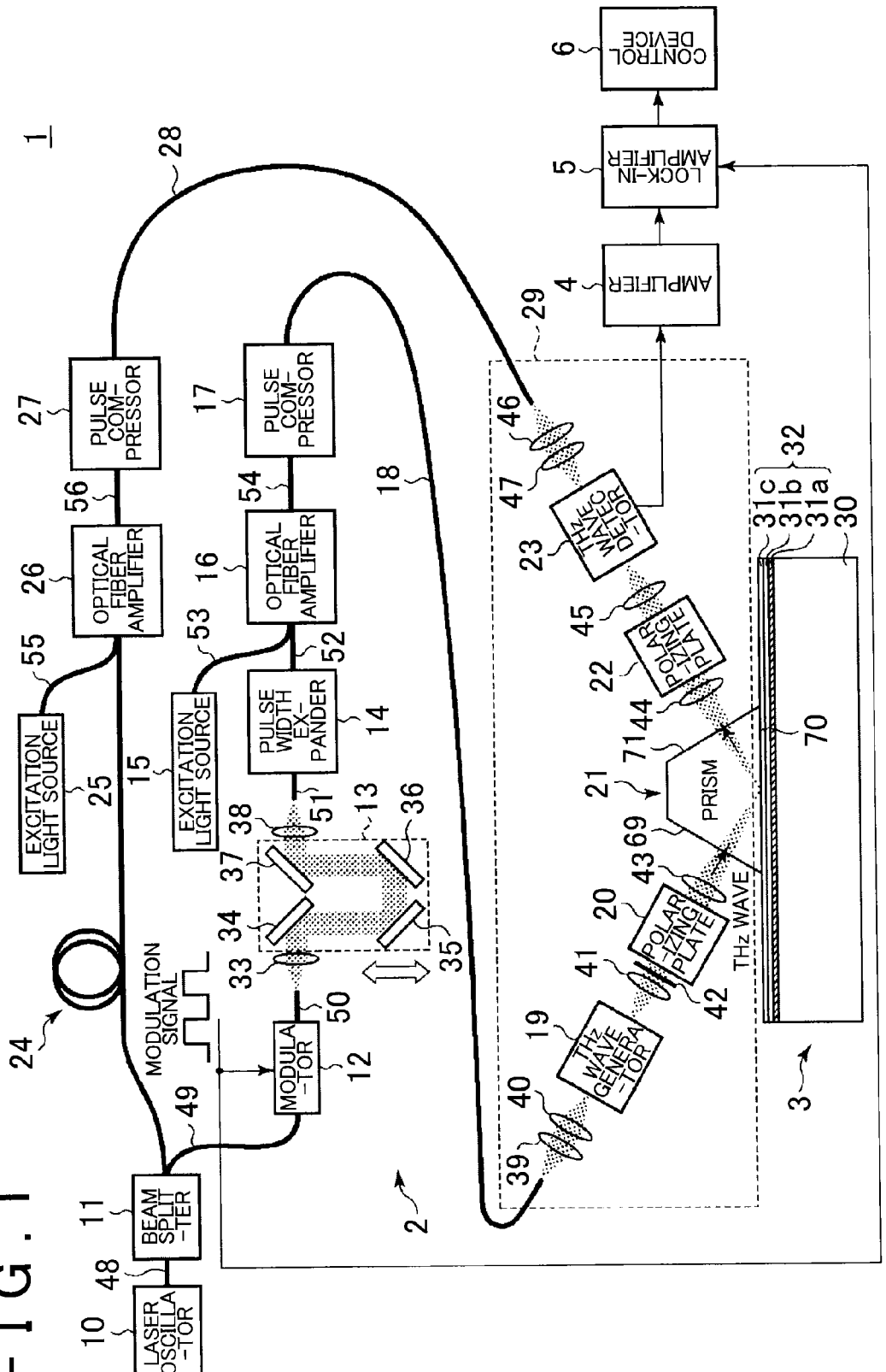
FIG. 1 is a block diagram of a film thickness measuring device according to an embodiment.

A film thickness measuring device and a film thickness measuring method according to the embodiment will be described by using the drawings. FIG. 1 is a block diagram of the film thickness measuring device according to the embodiment.

Note that, in the embodiment, the description will be given by taking, as an example, the case where components are optically coupled to each other by mainly using an optical fiber in order to secure stability and fastness, but the embodiment is not limited thereto. For example, the components may also be coupled to each other by using a bulk optical system.

A film thickness measuring device 1 according to the embodiment has an optical device 2 that applies the terahertz wave to a sample 3 and detects the reflected wave from the sample 3. The optical device 2 includes a laser oscillator 10, a beam splitter (BS) 11, a modulator 12, an optical delay section 13, a terahertz wave generator 19, a prism 21, and a terahertz wave detector 23. Further, the film thickness measuring device 1 according to the embodiment includes an amplifier 4 that amplifies a detection signal of the reflected wave from the sample 3, a lock-in amplifier 5 that synchronously amplifies the detection signal amplified by the amplifier 4, and a control device (control section) 6 that controls the entire film thickness measuring device 1. The control device may be configured as an electronic control unit (ECU).

A laser light beam emitted from the laser oscillator 10 is split into two laser light beams by the BS 11. One of the laser light beams obtained by the splitting by the BS 11 is used as a pump light beam. The pump light beam is modulated by the modulator 12, and is caused to enter the terahertz wave generator 19 via the optical delay section 13. The terahertz wave emitted from the terahertz wave generator 19 is applied to the sample 3 via the prism 21, and the reflected wave from the sample 3 enters the terahertz wave detector 23. On the other hand, the other laser light beam obtained by the splitting by the BS 11 is used as a probe light beam. The probe light beam is caused to enter the terahertz wave detector 23. The terahertz wave detector 23 detects the reflected wave from the sample 3 at the timing of the probe light beam. A signal detected by the terahertz wave detector 23 is amplified by the amplifier 4, and is further synchronously amplified by the lock-in amplifier 5. The signal synchronously amplified by the lock-in amplifier 5 is inputted to the control device 6 as measurement data. The control device 6 is capable of analyzing the measurement data from the lock-in amplifier 5 and determining the film thickness.

The optical device 2 includes the laser oscillator 10, the BS 11, the modulator 12, the optical delay section 13, a pulse width expander 14, an excitation light source 15, an optical fiber amplifier 16, and a pulse compressor 17. Further, the optical device 2 includes the terahertz wave generator 19, a polarizing plate 20, the prism 21, a polarizing plate 22, and the terahertz wave detector 23. The terahertz wave generator 19, the polarizing plate 20, the prism 21, the polarizing plate 22, and the terahertz wave detector 23 are disposed in an accommodation section (container, cabinet, casing, head) 29. Further, the optical device 2 includes an optical fiber 24 for optical path length adjustment, an excitation light source 25, an optical fiber amplifier 26, and a pulse compressor 27. Note that each of the polarizing plates 20 and 22 can also be replaced with a half-wave plate for the terahertz wave or the like.

The optical device 2 generates a pulsed terahertz wave, i.e., a terahertz pulse by using the laser oscillator 10 and the terahertz wave generator 19. As the laser oscillator 10, it is possible to use, e.g., a passive mode synchronized fiber laser or the like. The fiber laser is a solid-state laser in which an optical fiber is used as an amplifying medium. As the optical fiber used as the amplifying medium in the laser oscillator 10, it is possible to use, e.g., the optical fiber doped with an erbium (Er) ion. The laser light beam outputted from the laser oscillator 10 that uses the optical fiber doped with the Er ion as the amplifying medium is likely to satisfy a phase matching condition in a non-linear crystal provided in the terahertz wave generator 19, and propagate in the optical fiber. Consequently, herein, the optical fiber doped with the Er ion is used as the amplifying medium of the laser oscillator 10. The center wavelength of the laser light beam outputted from the laser oscillator 10 is set to, e.g., about 1.56 µm. The pulse width of the laser light beam outputted from the laser oscillator 10 is preferably smaller than, e.g., 1 ps. Herein, the pulse width of the laser light beam outputted from the laser oscillator 10 is set to, e.g., about 400 fs. The average power of the laser light beam outputted from the laser oscillator 10 is set to, e.g., about 40 mW. The repetition frequency of the laser light beam outputted from the laser oscillator 10 is set to, e.g., 50 MHz.

Note that the optical fiber used as the amplifying medium in the laser oscillator 10 is not limited to the optical fiber doped with the Er ion. As the amplifying medium in the laser oscillator 10, for example, the optical fiber doped with an ytterbium (Yb) ion or a thulium (Tm) ion may also be used. In addition, the laser oscillator 10 is not limited to the fiber laser. For example, the laser oscillator 10 that uses a Ti:sapphire crystal bulk or a Yb:YAG crystal bulk as the amplifying medium may also be used.

At the subsequent stage of the laser oscillator 10, the BS 11 is disposed. The laser light beam outputted from the laser oscillator 10 propagates in an optical fiber 48, and is inputted to the BS 11. As the optical fiber 48, it is possible to use, e.g., a polarization-holding optical fiber. The BS 11 splits the inputted laser light beam into two laser light beams and outputs them. One of the two laser light beams obtained by the splitting by the BS 11 is used for generation of the terahertz wave, i.e., used as the pump light beam. The other one of the two laser light beams obtained by the splitting by the BS 11 is used for detection of the terahertz wave, i.e., used as the probe light beam.

The pump light beam as one of the two laser light beams obtained by the splitting by the BS 11 propagates in an optical fiber 49, and is inputted to the modulator 12. As the optical fiber 49, it is possible to use, e.g., the polarization-holding optical fiber. As the modulator 12, it is possible to use, e.g., an acousto-optic modulator (AOM) or the like. A modulation signal is inputted to the modulator 12. As the modulation signal, it is possible to use, e.g., a rectangular wave of about 100 kHz. Note that the modulation signal is not limited thereto, and can be set appropriately. The pump light beam inputted to the modulator 12 is subjected to intensity modulation in the modulator 12. From the modulator 12, the pump light beam having been subjected to the intensity modulation so as to have about 100 kHz is outputted. Note that the intensity modulation is performed on the pump light beam by using the modulator 12 in order to perform lock-in detection (synchronous detection) of a weak electrical signal outputted from the terahertz wave detector 23 using the lock-in amplifier 5. Consequently, in the case where the lock-in detection is not used, it is not necessary to provide the modulator 12.

Note that the description has been given by taking the case where the pump light beam is subjected to the intensity modulation as an example, but the embodiment is not limited thereto. For example, the intensity modulation may also be performed on the terahertz wave outputted from the terahertz wave generator 19. In addition, the description has been given by taking the case where the AOM is used as the modulator 12 as an example, the embodiment is not limited thereto. For example, it is also possible to perform the intensity modulation of the pump light beam by using mechanical means such as an optical chopper or an MEMS mirror.

At the subsequent stage of the modulator 12, the optical delay section (delay line) 13 is disposed. The pump light beam outputted from the modulator 12 propagates in an optical fiber 50, is collimated by a collimating lens 33, and is inputted to the optical delay section 13. As the optical fiber 50, it is possible to use, e.g., the polarization-holding optical fiber. The optical delay section 13 is provided with, e.g., four mirrors 34 to 37. The pump light beam inputted to the optical delay section 13 is sequentially reflected by the mirrors 34 to 37, and is then outputted from the optical delay section 13. The pump light beam outputted from the optical delay section 13 is condensed by a condenser lens 38, and is introduced into an optical fiber 51. The optical delay section 13 is capable of changing a distance between the mirror 34 and the mirror 35 and a distance between the mirror 36 and the mirror 37 by changing the positions of the mirrors (movable mirrors) 35 and 36 by using a linear motion stage or the like. Accordingly, the optical delay section 13 is capable of changing the optical path length of the pump light beam, and changing (sweeping) a delay time of the pump light beam. Since it is possible to change the delay time of the pump light beam, it is possible to relatively change the timing of the terahertz wave and the timing of the probe light beam. An electrical signal outputted from the terahertz wave detector 23 corresponds to the electric field strength of the terahertz wave at the timing of the probe light beam. The pulse width of the probe light beam is sufficiently smaller than the pulse width of the terahertz wave. Accordingly, it is possible to reproduce the waveform of the terahertz wave by using the detection signal at each timing that is successively outputted from the terahertz wave detector 23.

Herein, the description has been given by taking the mechanical optical delay section 13 as an example, but the optical delay section 13 is not limited thereto. For example, two laser oscillators 10 having slightly different repetition frequencies are used, and the output of one of the laser oscillators 10 may be used as the pump light beam and the output of the other laser oscillator 10 may be used as the probe light beam. In addition, the laser oscillator 10 in which the repetition frequency periodically fluctuates may also be used.

Herein, the optical delay section 13 is disposed in the path of the pump light beam, but the optical delay section 13 may also be disposed in the path of the probe light beam.

At the subsequent stage of the optical delay section 13, the pulse width expander 14 is disposed. The pump light beam outputted from the optical delay section 13 is condensed by the condenser lens 38, propagates in the optical fiber 51, and is inputted to the pulse width expander 14. As the optical fiber 51, it is possible to use, e.g., the polarization-holding optical fiber. As the pulse width expander 14, it is possible to use, e.g., the pulse width expander in which two types of dispersion compensation fibers are combined. The pulse width expander in which two types of the dispersion compensation fibers are combined is capable of compensation up to third-order dispersion. The pulse width expander 14 increases the pulse width of the pump light beam. The pulse width of the pump light beam outputted from the pulse width expander 14 is, e.g., about several tens of ps. Since the pulse width is increased, the peak intensity of the pump light beam outputted from the pulse width expander 14 is reduced.

At the subsequent stage of the pulse width expander 14, the optical fiber amplifier 16 is disposed. The pump light beam outputted from the pulse width expander 14 propagates in an optical fiber 52, and is inputted to the optical fiber amplifier 16. As the optical fiber 52, it is possible to use, e.g., the polarization-holding optical fiber. The optical fiber amplifier 16 is a device capable of amplifying an optical signal in the optical fiber without converting the optical signal to the electrical signal. As the optical fiber amplifier 16, for example, an Er/YB co-doped fiber amplifier that uses the optical fiber co-doped with Er and Yb as the amplifying medium is used. The core diameter of the optical fiber used as the amplifying medium in the optical fiber amplifier 16 is set to, e.g., about 25 μm. In addition, the structure of the optical fiber used as the amplifying medium is a double-clad structure. Note that the structure of the optical fiber used as the amplifying medium is not limited to the double-clad structure, and may also be a single-clad structure.

The laser light beam (excitation light beam) outputted from the excitation light source 15 is further inputted to the optical fiber amplifier 16. The laser light beam outputted from the excitation light source 15 propagates in an optical fiber 53, and is inputted to the optical fiber amplifier 16. As the optical fiber 53, it is possible to use, e.g., the polarization-holding optical fiber. As the excitation light source 15, it is possible to use, e.g., a laser diode or the like. As the laser diode, it is possible to use, e.g., a multi-mode laser diode or the like. The rated output of the excitation light source 15 is set to, e.g., about 10 W. Herein, in order to supply the sufficient excitation light beam to the optical fiber amplifier 16, two excitation light sources 15 are provided and the outputs of the two excitation light sources 15 are inputted to the optical fiber amplifier 16. The optical fiber amplifier 16 uses the laser light beam outputted from the excitation light source 15 as the excitation light beam to amplify the pump light beam outputted from the pulse width expander 14. The average power of the pump light beam outputted from the optical fiber amplifier 16 is, e.g., about 1.5 W.

At the subsequent stage of the optical fiber amplifier 16, the pulse compressor 17 is disposed. The pump light beam outputted from the optical fiber amplifier 16 propagates in an optical fiber 54, and is inputted to the pulse compressor 17. As the optical fiber 54, it is possible to use, e.g., the polarization-holding optical fiber. The pulse compressor 17 reduces the pulse width of the pump light beam, and increases the peak intensity of the pump light beam. As the pulse compressor 17, it is possible to use, e.g., the pulse compressor that uses a diffraction grating pair. The diffraction grating pair gives abnormal GVD (negative dispersion) to a laser pulse having a positive chirp and compresses the pulse width of the laser pulse. As the diffraction grating pair, it is possible to use, e.g., a transmission type diffraction grating. When the transmission type diffraction grating is used, it is possible to obtain high diffraction efficiency and reduce a power loss in the pulse compressor 17. The laser pulse outputted from the pulse width expander 14 has the positive chirp, and it is possible to compress the pulse width of the laser pulse by using the pulse compressor 17 described above. The pulse width of the pump light beam outputted from the pulse compressor 17 is, e.g., about 200 fs. The average power of the pump light beam outputted from the pulse compressor 17 is, e.g., about 1 W.

Note that the diffraction grating used in the diffraction grating pair of the pulse compressor 17 is not limited to the transmission type diffraction grating. For example, the diffraction grating pair may also be configured by using a reflection type diffraction grating. In addition, the pulse compressor 17 that uses a prism pair may also be used.

Further, a phase adjustment element (not shown) may be added to the pulse width expander 14 or the pulse compressor 17. As the phase adjustment element, it is possible to use, e.g., a spatial liquid crystal optical modulator or the like. When the phase adjustment element is added to the pulse width expander 14 or the pulse compressor 17, it is possible to adjust the phase of the pump light beam more strictly.

The pump light beam outputted from the pulse compressor 17 propagates in an optical fiber 18. As the optical fiber 18, the optical fiber having a high-order soliton compression effect is used. The optical fiber 18 is preferably the polarization-holding optical fiber. Since the optical fiber 18 having the high-order soliton compression effect is used, it is possible to reduce the pulse width of the pump light beam in the process of propagation of the pump light beam in the optical fiber 18. The core diameter of the optical fiber 18 is set to, e.g., about 20 μM. The pulse width of the pump light beam at the output end of the optical fiber 18 is, e.g., about 30 fs. The average power of the pump light beam at the output end of the optical fiber 18 is set to, e.g., about 700 mW. Thus, the pump light beam having the sufficiently reduced pulse width is outputted from the output end of the optical fiber 18. Note that, in the embodiment, the pulse width of the pump light beam is set to be sufficiently narrow because it is preferable to use the terahertz wave having the narrowest possible pulse width in order to accurately measure a thin film thickness. The output end of the optical fiber 18 is positioned in the accommodation section 29.

On the other hand, the laser light beam obtained by the splitting by the BS 11, i.e., the probe light beam as the laser light beam for detection of the terahertz wave propagates in the optical fiber 24 for optical path length adjustment. The optical fiber 24 for optical path length adjustment is provided in order to synchronize the timing at which the terahertz wave reaches the terahertz wave detector 23 and the timing at which the probe light beam reaches the terahertz wave detector 23 by delaying the probe light beam. Note that, in the case where the delay time of the probe light beam can be adjusted by other optical fibers or space, the optical fiber 24 for optical path length adjustment may not be used. As the optical fiber 24, it is possible to use, e.g., the polarization-holding optical fiber.

The probe light beam having propagated in the optical fiber 24 is inputted to the optical fiber amplifier 26. A high intensity such as that of the pump light beam is not required of the probe light beam. Consequently, it is possible to use the optical fiber amplifier 26 having a relatively small amplification factor. As the optical fiber amplifier 26, it is possible to use, e.g., the optical fiber amplifier having the single-clad structure.

To the optical fiber amplifier 26, the laser light beam (excitation light beam) outputted from the excitation light source 25 is further inputted. The laser light beam outputted from the excitation light source 25 propagates in an optical fiber 55, and is inputted to the optical fiber amplifier 26. As the excitation light source 25, it is possible to use, e.g., a laser diode or the like. As the optical fiber 55, it is possible to use, e.g., the polarization-holding optical fiber. The optical fiber amplifier 26 uses the laser light beam outputted from the excitation light source 25 as the excitation light beam to amplify the probe light beam.

At the subsequent stage of the optical fiber amplifier 26, the pulse compressor 27 is disposed. The probe light beam outputted from the optical fiber amplifier 26 propagates in an optical fiber 56, and is inputted to the pulse compressor 27.

It is possible to reduce the pulse width of the probe light beam using the pulse compressor 27. As the optical fiber 56, it is possible to use, e.g., the polarization-holding optical fiber.

The probe light beam outputted from the pulse compressor 27 propagates in an optical fiber 28. As the optical fiber 28, the optical fiber having the high-order soliton compression effect is used. The optical fiber 28 is preferably the polarization-holding optical fiber. Since the optical fiber 28 having the high-order soliton compression effect is used, it is possible to reduce the pulse width of the probe light beam in the process of propagation of the probe light beam in the optical fiber 28. In the embodiment, as the optical fiber 28, an optical fiber obtained by connecting two types of optical fibers having different core diameters in series is used. One of the two types of the optical fibers is the optical fiber having the core diameter of e.g., 25 μm. The other one of two types of the optical fibers is the optical fiber having the core diameter of, e.g., 10 μm. The probe light beam outputted from the pulse compressor 27 propagates in the optical fiber having the core diameter of 25 μm first, and then propagates in the optical fiber having the core diameter of 10 μm. Thus, in the process of propagation of the probe light beam in the optical fiber 28, two-stage pulse compression is performed. The pulse width of the probe light beam outputted from the output end of the optical fiber 28 is, e.g., about 30 fs. The average power of the probe light beam outputted from the output end of the optical fiber 28 is, e.g., about 100 mW. The output end of the optical fiber 28 is positioned in the accommodation section 29.

Note that, in the embodiment, the description has been given by taking the case where the amplification is performed on the laser light beams after the splitting by the BS 11 as an example, but the embodiment is not limited thereto. For example, after the amplification of the laser light beam is performed, the laser light beam may also be split by the BS 11.

The pump light beam emitted from the output end of the optical fiber 18 is inputted to the terahertz wave generator 19 via a collimating lens 39 and a condenser lens 40 disposed in the accommodation section 29. As the terahertz wave generator 19, it is possible to use, e.g., a DAST (4-N, N-dimethylamino-4'-N'-methyl-stilbazoliumtosylate) crystal. The DAST crystal is an organic non-linear optical crystal having a high non-linear coefficient. Since the non-linear coefficient is high, when the DAST crystal is used as the terahertz wave generator 19, it is possible to generate the terahertz wave at high conversion efficiency. In addition, the DAST crystal satisfies a collinear phase matching condition over a wide band for the laser light having a wavelength in a band of 1.5 μm. Consequently, when the DAST crystal is used as the terahertz wave generator 19, it is possible to generate the broadband terahertz wave having a high intensity.

Note that, in the case where the non-linear crystal is used as the terahertz wave generator 19, it is preferable to set the non-linear crystal such that the pump light beam enters in a polarization direction in which the non-linear effect is displayed most significantly.

Note that the terahertz wave generator 19 is not limited to the DAST crystal. As the terahertz wave generator 19, it is possible to use various non-linear optical crystals. For example, as the terahertz wave generator 19, it is also possible to use an inorganic crystal such as ZnTe or GaP. In addition, as the terahertz wave generator 19, it is also possible to use DASC (4-N, N-dimethylamino-4'-N'-methyl-stilbazoliump-chlorobenezenesulfonate) as an organic non-linear optical crystal. Further, as the terahertz wave generator 19, it is also possible to use OH1 (2-(3-(4-Hydroxystyryl)-5,5-dimethylcyclohex-2-enylidene) malononitrile) as the organic non-linear optical crystal. Note that the center wavelength of the pump light beam may be set appropriately according to the type of the non-linear optical crystal used as the terahertz wave generator 19.

In addition, a Cerenkov phase matching type terahertz wave source that uses a waveguide of a lithium niobate (LiNbO3) crystal may be used as the terahertz wave generator 19. Further, it is also possible to use a photoconductive antenna device as the terahertz wave generator 19. The photoconductive antenna device can be configured by providing, e.g., a pair of dipole antennas having metal electrodes on a photoconductive substrate. As the photoconductive substrate, it is possible to use, e.g., a low-temperature grown GaAs substrate or the like.

In the case where the photoconductive antenna device is used as the terahertz wave generator 19, it is preferable to set an incident polarization direction of the pump light beam relative to the direction of the dipole antenna such that the terahertz wave is emitted most intensely.

The terahertz wave outputted from the terahertz wave generator 19 is inputted to the prism 21 via a collimating lens 41, a laser light cut filter 42, the polarizing plate 20, and a condenser lens 43. As the material of the collimating lens 41 and the condenser lens 43, it is preferable to use a lens material having sufficiently high transmission efficiency to the terahertz wave. An example of the lens material having sufficiently high transmission efficiency to the terahertz wave includes a cycloolefin polymer. By using the collimating lens 41 and the condenser lens 43 each having sufficiently high transmission efficiency to the terahertz wave, it is possible to obtain the broadband terahertz wave. Since the broadband terahertz wave is obtained, it is possible to obtain the terahertz wave having a narrow pulse width.

Note that the lens material having sufficiently high transmission efficiency to the terahertz wave is not limited to the cycloolefin polymer. For example, a methylpentene polymer (polymethylpentene) or the like may also be used as the material of the collimating lens 41 and the condenser lens 43. The methylpentene polymer is a resin provided under the name of TPX (registered trademark). Further, a semiconductor material such as silicon may also be used as the material of the collimating lens 41 and the condenser lens 43.

Note that the description has been given by taking the case where the terahertz wave is collimated and condensed by using the lenses 41 and 43 as an example, but means for collimating or condensing the terahertz wave is not limited thereto. For example, the terahertz wave may also be collimated and condensed by using a parabolic mirror. In addition, the collimating and condensing of the terahertz wave may also be performed by combining the lens and the parabolic mirror.

The terahertz wave condensed by the condenser lens 43 is applied to the sample 3 via the prism (coupling prism) 21. The prism 21 is a prism for the terahertz wave, i.e., a prism formed of a material that allows passage of the terahertz wave. The prism 21 includes an entrance surface (first surface) 69 through which the terahertz wave is caused to enter, an abutment surface (second surface, contact surface, sensor surface, application surface) 70 that abuts a surface of the sample 3 on a side where a coating film (multi-layer film 32) is formed, and an emission surface (third surface) 71 from which the terahertz wave reflected at the sample 3 is emitted. The cross section of the prism 21 is, e.g., trapezoidal. The optical axis of the terahertz wave caused to enter through the entrance surface 69 is directed, e.g., in the direction of the normal to the entrance surface 69. The optical axis of the reflected wave reflected at an interface between the prism 21 and the sample 3 and emitted from the emission surface 71 is directed, e.g., in the direction of the normal to the emission surface 71. As the material of the prism 21, it is possible to use, e.g., a cycloolefin polymer resin or the like. The cycloolefin polymer optical resin is provided under the name of ZEONEX (registered trademark) by ZEON CORPORATION. Note that the material of the prism 21 is not limited to the cycloolefin polymer resin. For example, Teflon, quartz, or silicon may also be used as the material of the prism 21.

An example of the sample (object to be measured, measurement target, inspection target) 3 includes an object obtained by forming the multi-layer film 32 on a base material 30. The multi-layer film 32 includes a film 31a as the first layer, a film 31b as the second layer formed on the film 31a as the first layer, and a film 31c as the third layer formed on the film 31b as the second layer.

An example of the material of the base material 30 includes a resin or the like. An example of the film 31a as the first layer includes a conductive primer layer formed by applying a conductive primer coating. The conductive primer coating is a coating for a primer coat that is used when electrostatic coating is performed on a non-conductive base material made of a resin or the like. A conductive filler such as a metal powder or a carbon powder is blended in the conductive primer coating. The thickness of the conductive primer layer 31a is set to, e.g., about several μm and, more specifically, about five to seven μm. An example of the film 31b as the second layer includes a metallic base layer formed by applying a metallic base. The metallic base is a coating in which a flaky aluminum pigment (aluminum powder) is blended. The thickness of the film 31b as the second layer is set to, e.g., about 10 to 15 μm. The film 31b as the second layer contains a conductive particle (metal particle, metal powder) having the size of several μm to several tens of μm, and hence dispersion or absorption of the terahertz wave occurs in the film 31b as the second layer. When the dispersion or absorption mentioned above occurs, the pulse width of the terahertz wave is increased. Note that the material of the film 31b as the second layer is not limited to the coating in which the flaky aluminum pigment is blended. For example, as the material of the film 31b as the second layer, a coating in which a flaky mica pigment (pearl pigment) is blended may also be used. An example of the film 31c as the third layer includes a clear layer formed by applying a clear. In order to realize improvements in gloss, durability, and maintenance, the clear layer is applied as a final topcoat. The thickness of the film 31c as the third layer is set to, e.g., about 30 to 40 μm. In general, the refractive index of the clear layer 31c is relatively small. On the other hand, in general, the refractive index of the metallic base layer 31b is relatively large. In addition, in general, the refractive index of the conductive primer layer 31a is larger than that of the clear layer 31c and is smaller than that of the metallic base layer 31b.

Figure 2:
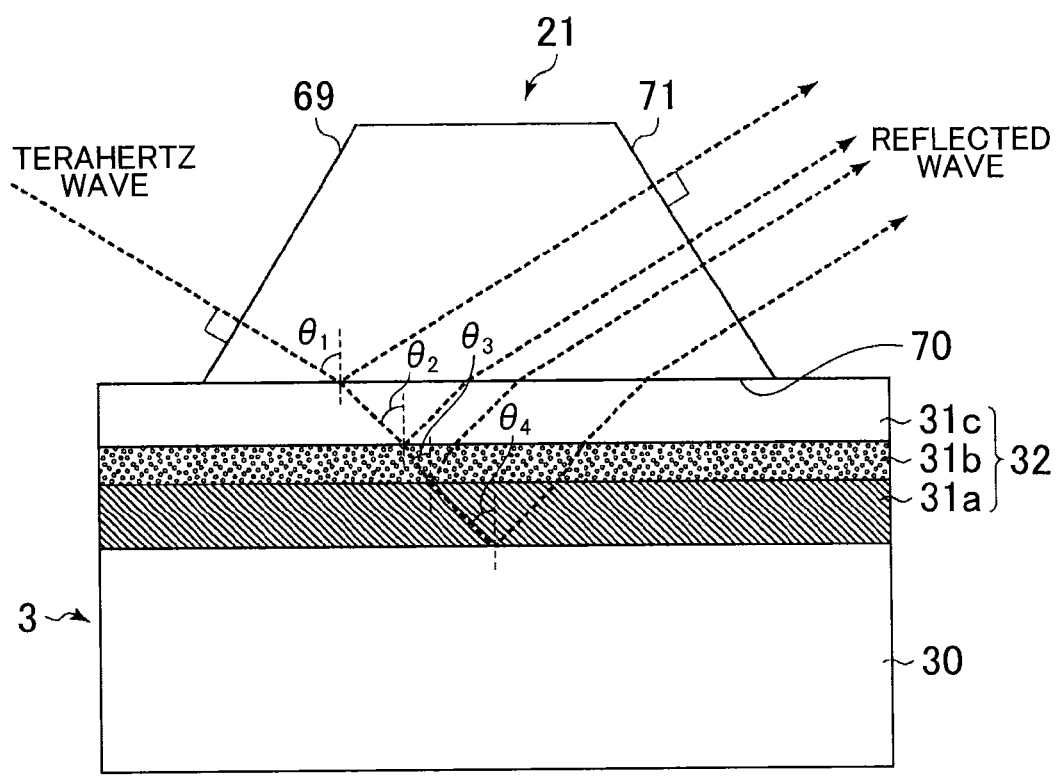
FIG. 2 is a schematic diagram showing propagation of a terahertz wave applied to a sample.

FIG. 2 is a schematic diagram showing propagation of the terahertz wave applied to the sample. As shown in FIG. 2, the terahertz wave that is caused to enter through the entrance surface 69 of the prism 21 propagates in the prism 21, and reaches an interface between the abutment surface 70 of the prism 21 and the film 31c as the third layer. The incident angle of the terahertz wave at the interface between the prism 21 and the film 31c as the third layer is θ1. Part of the terahertz wave having reached the interface between the prism 21 and the film 31c as the third layer is reflected at the interface between the prism 21 and the film 31c as the third layer (reflected wave), and is emitted via the emission surface 71. On the other hand, the other part of the terahertz wave having reached the interface between the prism 21 and the film 31c as the third layer is refracted at the interface between the prism 21 and the film 31c as the third layer, propagates in the film 31c as the third layer, and reaches an interface between the film 31c as the third layer and the film 31b as the second layer. The incident angle of the terahertz wave at the interface between the film 31c as the third layer and the film 31b as the second layer is θ2. Part of the terahertz wave having reached the interface between the film 31c as the third layer and the film 31b as the second layer is reflected at the interface between the film 31c as the third layer and the film 31b as the second layer (reflected wave), is refracted at the interface between the film 31c as the third layer and the prism 21, and is emitted via the emission surface 71. The other part of the terahertz wave having reached the interface between the film 31c as the third layer and the film 31b as the second layer is refracted at the interface between the film 31b as the second layer and the film 31c as the third layer, propagates in the film 31b as the second layer, and reaches an interface between the film 31b as the second layer and the film 31a. The incident angle of the terahertz wave at the interface between the film 31b as the second layer and the film 31a as the first layer is θ3. Part of the terahertz wave having reached the interface between the film 31b as the second layer and the film 31a as the first layer is reflected at the interface between the film 31b as the second layer and the film 31a as the first layer (reflected wave), is refracted at the interface between the film 31b as the second layer and the film 31c as the third layer, is further refracted at the interface between the film 31c as the third layer and the prism 21, and is emitted via the emission surface 71. The other part of the terahertz wave having reached the interface between the film 31b as the second layer and the film 31a as the first layer is refracted at the interface between the film 31b as the second layer and the film 31a as the first layer, propagates in the film 31a as the first layer, and reaches an interface between the film 31a as the first layer and the base material 30. The incident angle of the terahertz wave at the interface between the film 31a as the first layer and the base material 30 is θ4. Part of the terahertz wave having reached the interface between the film 31a as the first layer and the base material 30 is reflected at the interface between the film 31a as the first layer and the base material 30 (reflected wave). The terahertz wave reflected at the interface between the film 31a as the first layer and the base material 30 is refracted at the interface between the film 31a as the first layer and the film 31b as the second layer, is further refracted at the interface between the film 31b as the second layer and the film 31c as the third layer, is further refracted at the interface between the film 31c as the third layer and the prism 21, and is emitted via the emission surface 71.

In the embodiment, the terahertz wave is applied to the sample 3 via the prism 21 because it becomes possible to set the incident angle θ4 of the terahertz wave at the interface between the film 31a as the first layer and the base material 30 to a sufficiently large value when the prism 21 is used. That is, when the terahertz wave becomes incident on the interface between two substances having different refractive indexes at a certain incident angle, a P-polarized light as a polarization component of which the oscillation direction of the electric field is parallel with the plane of incidence and an S-polarized light as a polarization component of which the oscillation direction of the electric field is perpendicular to the plane of incidence have different reflectances at the interface. When the incident angle is gradually increased from 0 degrees, the reflectance of the P-polarized light decreases, becomes equal to 0 at the Brewster angle and, thereafter, the phase thereof is inverted and the reflectance thereof increases. On the other hand, the reflectance of the S-polarized light increases monotonously. Consequently, when the incident angle θ4 of the terahertz wave at the interface between the film 31a as the first layer and the base material 30 is set to a sufficiently large value, the reflectance of the P-polarized light at the interface between the film 31a as the first layer and the base material 30 becomes sufficiently small, or the phase of the P-polarized light reflected at the interface between the film 31a as the first layer and the base material 30 is inverted. As a result, it is possible to make a difference between the time waveform of the P-polarized light and the time waveform of the S-polarized light, and it becomes possible to measure the thickness of the film 31a as the first layer based on the difference. However, even when it is intended that the incident angle θ4 of the terahertz wave at the interface between the film 31a as the first layer and the base material 30 is set to a sufficiently large value without using the prism 21, the refractive index of the film 31c as the third layer to air is significantly large, and hence the terahertz wave is refracted largely, and it is not possible to set the incident angle θ4 to the sufficiently large value. On the other hand, in the case where the incident angle θ1 of the terahertz wave on the surface of the film 31c as the third layer is set to a small value, the incident angle θ4 of the terahertz wave at the interface between the film 31a as the first layer and the base material 30 does not become sufficiently large, and the difference between the reflectance of the P-polarized light and the reflectance of the S-polarized light does not become significant at the interface between the film 31a as the first layer and the base material 30. When the difference between the reflectance of the P-polarized light and the reflectance of the S-polarized light does not become significant, it is difficult to measure the thickness of the film 31a as the first layer by a method described later. For this reason, the terahertz wave is applied to the sample 3 via the prism 21 in the embodiment.

It is important to set each of the incident angles θ1 to θ4 to a value smaller than the value of a critical angle such that total reflection of the terahertz wave does not occur at the interface between the prism 21 and the film 31c as the third layer, the interface between the film 31c as the third layer and the film 31b as the second layer, the interface between the film 31b as the second layer and the film 31a as the first layer, and the interface between the film 31a as the first layer and the base material 30. In addition, it is also important to set the incident angle θ4 of the terahertz wave at the interface between the film 31a as the first layer and the base material 30 to a sufficiently large value. Note that the incident angle θ4 of the terahertz wave at the interface between the film 31a as the first layer and the base material 30 does not need to completely match the Brewster angle. This is because, when the incident angle θ4 of the terahertz wave at the interface between the film 31a as the first layer and the base material 30 is set to be large to a certain degree, it is possible to make the difference between the time waveform of the P-polarized light and the time waveform of the S-polarized light, and it is possible to measure the thickness of the film 31a as the first layer based on the above difference. In consideration of these points comprehensively, the incident angle of the terahertz wave may be set appropriately.

Various configurations can be assumed as the configuration of the multi-layer film 32 of the sample 3 serving as the measurement target. Consequently, it is preferable to set the incident angle of the terahertz wave to proper values such that the measurement can be performed on the multi-layer films 32 having assumed various configurations. For example, in the assumed various configurations, in the case where the limit value of the incident angle θ1 that does not cause the total reflection is θ1 max, the incident angle θ1 at the interface between the prism 21 and the film 31c as the third layer may be set to a value slightly smaller than θ1 max.

The beam waist of the terahertz wave (terahertz wave beam) entering through the entrance surface 69 is preferably positioned in the multi-layer film 32 or in the vicinity of the multi-layer film 32. The Rayleigh length of the terahertz wave beam is preferably longer than the thickness of the multi-layer film 32.

It is preferable to use a material through which the terahertz wave can easily pass as the material of the prism 21. In addition, it is preferable to appropriately select the material of the prism 21 according to the refractive index of the film 31c as the third layer that abuts the prism 21. For example, in the case where the multi-layer film 32 serving as the measurement target is a coating film applied to a body of an automobile, the film 31c as the third layer that abuts the prism 21 is the clear layer. The refractive index of a terahertz area in the clear layer is, e.g., about 1.7 which is relatively small. On the other hand, in the case where the film that abuts the prism 21 is the metallic base layer or a porous ceramic layer, the refractive index is, e.g., about 4 which is relatively large. In the case where the refractive index of the film 31c as the third layer that abuts the prism 21 is relatively low, it is preferable to use the material having a relatively low refractive index as the material of the prism 21. As the material for forming the prism 21 having a relatively low refractive index, it is possible to use, e.g., the cycloolefin polymer or the methylpentene polymer. On the other hand, in the case where the refractive index of the film 31c as the third layer that abuts the prism 21 is relatively high, it is preferable to use the material having a relatively high refractive index as the material of the prism 21. As the material for forming the prism 21 having a relatively high refractive index, it is possible to use, e.g., silicon or the like. When a difference in refractive index between the prism 21 and the film 31c as the third layer is prevented from becoming excessively large, it is possible to hold the refraction at the interface between the prism 21 and the film 31c as the third layer small. In addition, when the difference in refractive index between the prism 21 and the film 31c as the third layer is prevented from becoming excessively large, it is possible to prevent excessive occurrence of the reflection at the interface between the prism 21 and the film 31c as the third layer, and cause the terahertz wave having a sufficient intensity to reach the interface between the film 31a as the first layer and the base material 30. Since it is possible to cause the terahertz wave having the sufficient intensity to reach the interface between the film 31a as the first layer and the base material 30, it is possible to properly reflect the terahertz wave at the interface between the film 31a as the first layer and the base material 30 and, by extension, measure the thickness of the film 31a as the first layer more reliably.

The sectional shape of the prism 21 can be formed into, e.g., a shape shown in FIG. 2. As described above, the angle of the entrance surface 69 of the prism 21 is set such that the optical axis of the terahertz wave caused to enter through the entrance surface 69 is directed e.g., in the direction of the normal to the entrance surface 69. In addition, as described above, the angle of the emission surface 71 of the prism 21 is set such that the optical axis of the reflected wave reflected at the interface between the prism 21 and the film 31c as the third layer is directed in the direction of the normal to the emission surface 71. The dimensions of the prism 21 are set to dimensions that allow the terahertz wave to be applied to the sample 3 reliably via the entrance surface 69 and allow the reflected wave from the sample 3 to be emitted from the emission surface 71 reliably.

The application of the terahertz wave to the sample 3 via the prism 21 contributes to elimination of an influence exerted on the terahertz wave by water in the air. That is, in the case where the measurement of the film thickness is performed in an environment in which humidity is relatively high, even when the terahertz wave progresses in the air only by several centimeters, the terahertz wave is influenced by the water in the air. When the terahertz wave attenuates by the water in the air, it is not possible to detect the reflected wave having a sufficient intensity, and it becomes difficult to measure the film thickness accurately and reliably. In addition, in order to measure the film thickness with high accuracy, it is important to apply the excellent terahertz wave having a short pulse width to the sample 3. However, when the terahertz wave is influenced by the water in the air, a high frequency component in the terahertz wave may attenuate and the pulse width of the terahertz wave may be increased. When the pulse width of the terahertz wave is increased, it becomes difficult to measure the film thickness with high accuracy. In addition, when the terahertz wave is influenced by the water in the air, the spectrum of the terahertz wave may become discrete. When the spectrum of the terahertz wave becomes discrete, an oscillation component that continues subtly is seen in the time waveform of the reflected wave. The oscillation component in the time waveform of the reflected wave becomes a factor that inhibits the measurement of the film thickness with high accuracy. In the embodiment, since the terahertz wave is applied to the sample 3 via the prism 21, it is possible to seal an opening portion for terahertz wave application formed in the accommodation section 29 with the prism 21. Consequently, according to the embodiment, it is possible to dehumidify the air in the accommodation section 29 more reliably, and eliminate the influence exerted on the terahertz wave by the water in the air. Note that the dehumidification of the air in the accommodation section 29 can be performed by introducing dried air or nitrogen into the accommodation section 29. In addition, the accommodation section 29 may also be evacuated.

The terahertz wave reflected at the sample 3 (reflected wave) propagates in the prism 21, and is emitted from the emission surface 71 of the prism 21. The reflected wave emitted from the emission surface 71 of the prism 21 is collimated by a collimating lens 44, is condensed by a condenser lens 45 via the polarizing plate 22, and is caused to enter the terahertz wave detector 23. As the terahertz wave detector 23, for example, the photoconductive antenna device is used. The above photoconductive antenna device can be configured by providing a pair of the dipole antennas having the metal electrodes on the photoconductive substrate. As the photoconductive substrate, it is possible to use, e.g., the low-temperature grown GaAs substrate or the like.

On the surface of the photoconductive substrate on a side where the dipole antenna is not formed, for example, a lens made of silicon is disposed. The terahertz wave is caused to enter the photoconductive substrate via the lens. The probe light beam is applied to the surface of the photoconductive substrate on a side where the dipole antenna is formed. More specifically, the probe light beam is applied to a gap between the pair of the dipole antennas. An electrical signal (current signal) corresponding to the electric field strength of the terahertz wave at the timing at which the probe light beam is applied to the gap between the pair of the dipole antennas is outputted from the photoconductive antenna device.

The photoconductive antenna device has a polarization characteristic determined by the orientation of the dipole antenna. Accordingly, when the photoconductive antenna device is disposed such that the longitudinal direction of the gap between the dipole antennas has an angle of the middle between the S polarization and the P polarization, it is possible to detect components of both of the S polarization and the P polarization.

The photoconductive antenna device that uses the low-temperature grown GaAs substrate as the photoconductive substrate is operated by applying the probe light beam having a wavelength in the vicinity of 800 nm in many cases. However, when the intensity of the probe light beam is sufficiently high, the photoconductive antenna device can be operated even when the wavelength of the probe light beam is in a band of 1.5 μm.

The probe light beam having the wavelength in the band of 1.5 μm may be subjected to wavelength conversion using a wavelength conversion device, and the probe light beam having been subjected to the wavelength conversion may be inputted to the photoconductive antenna device. As the above wavelength conversion device, it is possible to use, e.g., a non-linear device of periodically poled lithium niobate (PPLN) or the like.

In addition, the photoconductive antenna device designed to operate with the probe light beam having the wavelength in the band of 1.5 μm may also be used as the terahertz wave detector 23. In the above photoconductive antenna device, for example, an InGaAs substrate or the like is used as the photoconductive substrate.

Note that the description has been given by taking the case where the photoconductive antenna device is used as the terahertz wave detector as an example, but the embodiment is not limited thereto. For example, it is also possible to detect the terahertz wave by using an electro-optic (EO) crystal. As the EO crystal, it is possible to use, e.g., inorganic non-linear optical crystals of ZnTe, GaP, and InAs. In addition, as the EO crystal, organic non-linear optical crystals of DAST, DASC, and OH1 may also be used. It is preferable to appropriately select the type and thickness of the EO optical crystal in consideration of the wavelength bands and non-linear coefficients of the probe light beam and the terahertz wave. When the terahertz wave passes through the EO crystal to which the electric field is applied, by a Pockels effect as one of EO effects, the terahertz wave is subjected to birefringence. The birefringence denotes a phenomenon in which the refractive index of light having a polarization component parallel with a crystal axis (ordinary ray) and the refractive index of light having a polarization component perpendicular to the crystal axis (extraordinary ray) are different from each other. In the Pockels effect, a birefringence amount depends on the electric field to be applied. In the detection of the terahertz wave that uses the EO crystal, the electric field of the terahertz wave plays a role of the electric field that causes the Pockels effect. The polarization state of the probe light beam (linear polarized light) changes according to the temporal change of the electric field strength of the terahertz wave, and hence it is possible to measure the time waveform of the terahertz wave by analyzing the polarization state of the probe light beam at each timing.

The electrical signal (current signal) outputted from the terahertz wave detector 23 is inputted to the amplifier 4. The amplifier 4 amplifies the weak electrical signal (current signal) outputted from the terahertz wave detector 23. As the amplifier 4, it is possible to use, e.g., a current amplifier.

The signal amplified by the amplifier 4 is inputted to the lock-in amplifier 5. The lock-in amplifier 5 is an amplifier having both of a signal amplification function and a specific signal detection function. The lock-in amplifier 5 detects and amplifies a signal having a specific frequency, and thereby performs detection of a weak signal berried in noises and high-sensitivity signal detection. The lock-in amplifier 5 needs a reference signal for extracting only a signal to be detected from among inputted signals. Herein, a signal synchronized with the modulation signal described above is used as the reference signal.

Note that the lock-in amplifier 5 is used in this case, but the lock-in amplifier 5 does not necessarily need to be used. Even when the lock-in amplifier 5 is not used, it is possible to detect the terahertz wave. For example, it is also possible to obtain a signal having a high S/N ratio by integrating a signal detected by using the terahertz wave detector 23.

As will be described later, the film thickness measuring device 1 according to the embodiment detects the S-polarization component (S wave) and the P-polarization component (P wave) of the reflected wave from the sample 3, and measures the thickness of the film 31*a* as the first layer based on the difference between the time waveform (behavior) of the S-polarization component and the time waveform (behavior) of the P-polarization component. Accordingly, the film thickness measuring device 1 according to the embodiment detects the S-polarization component and the P-polarization component of the reflected wave from the sample 3. The S-polarization component and the P-polarization component of the reflected wave from the sample 3 can be detected by, e.g., the following method.

First, the polarization direction of the pump light beam that is caused to enter the terahertz wave generator 19 is inclined relative to the sample 3 in advance. It is possible to adjust the polarization direction of the pump light beam that is caused to enter the terahertz wave generator 19 by rotating the optical fiber 18 or the like. In addition, it is also possible to adjust the polarization direction of the pump light beam that is caused to enter the terahertz wave generator 19 by using a wave plate such as a half-wave plate or a quarter-wave plate. The optical axis in the terahertz wave generator 19 is pre-set according to the polarization direction of the pump light beam that is caused to enter the terahertz wave generator 19. In the case where the non-linear crystal is used as the terahertz wave generator 19, it is preferable to set the relationship between the direction of the crystal axis of the non-linear crystal and the polarization direction of the pump light beam such that the non-linear effect is displayed most significantly. In the case where the photoconductive antenna device is used as the terahertz wave generator 19, it is preferable to set the relationship between the direction of the dipole antenna of the photoconductive antenna device and the polarization direction of the pump light beam such that the terahertz wave having a sufficient intensity can be generated. When the terahertz wave is generated by the terahertz wave generator 19 in the state set in the above manner, the polarization state of the terahertz wave outputted from the terahertz wave generator 19 is inclined relative to the sample 3. In the case where the inclination of the terahertz wave is set to 45 degrees, the S-polarization component and the P-polarization component become equal to each other, and hence well-balanced measurement is allowed. Consequently, herein, the inclination of the terahertz wave outputted from the terahertz wave generator 19 is set to, e.g., 45 degrees.

In the embodiment, the polarization component of the terahertz wave applied to the sample 3 is switched by using the polarizing plate 20 disposed at a stage prior to the prism 21. The terahertz wave outputted from the terahertz wave generator 19 includes the S-polarization component and the P-polarization component. When the polarizing plate 20 is set so as to allow the passage of only the S-polarization component, only the S-polarization component of the terahertz wave is applied to the sample 3. On the other hand, when the polarizing plate 20 is set so as to allow the passage of only the P-polarization component, only the P-polarization component of the terahertz wave is applied to the sample 3. When the polarizing plate 20 is rotated by 90 degrees, it is possible to set the polarizing plate 20 such that the passage of only the P-polarization component is allowed. Note that it is possible to rotate the polarizing plate 20 by using, e.g., an actuator 73 (see FIG. 3). It is possible to control the actuator 73 by, e.g., the control device 6. Note that it is also possible to provide the half-wave plate for the terahertz wave instead of the polarizing plate 20 and switch the polarization state by appropriately setting a rotation angle of the half-wave plate.

In the case where the polarizing plate 20 is set so as to allow the passage of only the S-polarization component of the terahertz wave, the polarizing plate 22 is set so as to allow the passage of only the S-polarization component of the reflected wave. In the case where the polarizing plate 20 is set so as to allow the passage of only the P-polarization component of the terahertz wave, the polarizing plate 22 is set so as to allow the passage of only the P-polarization component of the reflected wave. When the polarizing plate 22 is rotated by 90 degrees, it is possible to set the polarizing plate 22 such that the passage of only the P-polarization component is allowed. Note that it is possible to rotate the polarizing plate 22 by using, e.g., an actuator 74 (see FIG. 3). It is possible to control the actuator 74 by, e.g., the control device 6.

Note that, since the polarization component of the terahertz wave is switched only by the polarizing plate 20, the polarizing plate 22 may not be provided in the configuration of FIG. 1.

The terahertz wave detector 23 has polarization dependence, and hence the terahertz wave detector 23 may be inclined and disposed such that both of the S-polarization component and the P-polarization component can be detected. In addition, it is also possible to dispose the half-wave plate for the terahertz wave at the stage prior to the terahertz wave detector 23 and control the polarization state of the terahertz wave that is caused to enter the terahertz wave detector 23 by appropriately setting the rotation angle of the half-wave plate.

A synchronously amplified signal detected by the lock-in amplifier 5 is inputted to the control device 6 as measurement data. The control device 6 determines the time waveform of the terahertz wave based on the measurement data from the lock-in amplifier 5. The control device 6 is capable of determining the film thickness based on the acquired time waveform.

Figure 3:
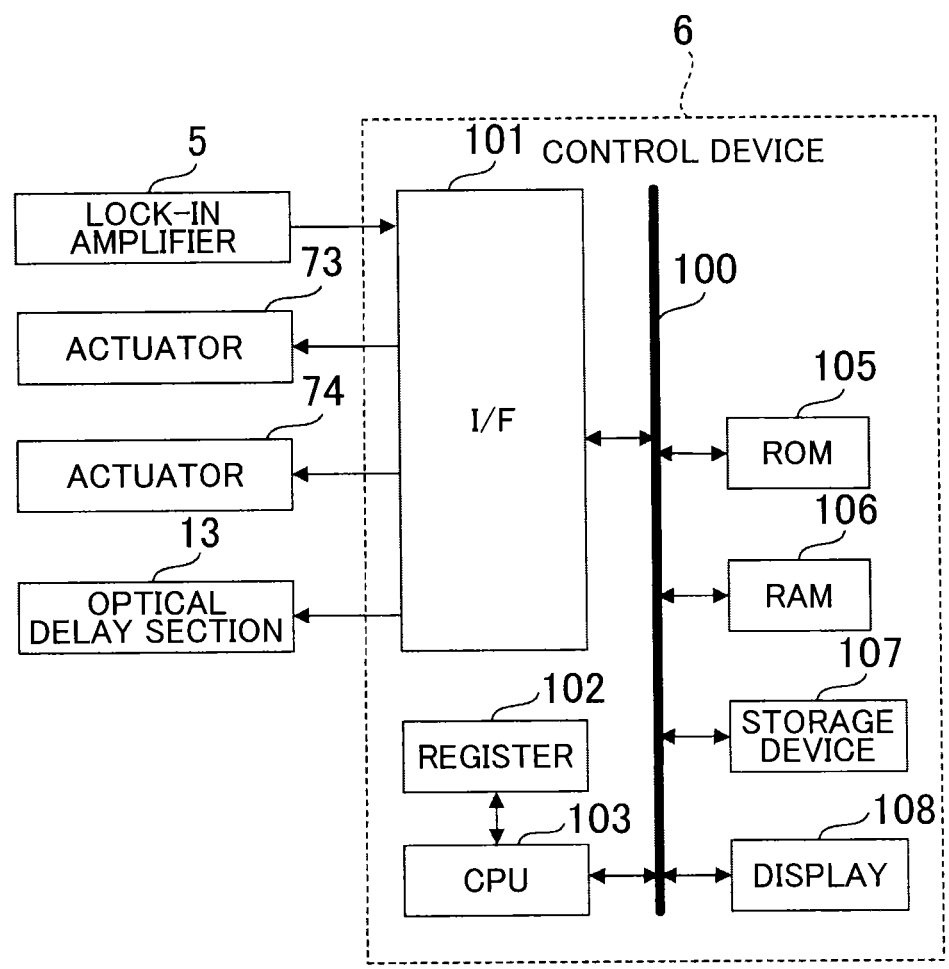
FIG. 3 is a block diagram showing a control device of the film thickness measuring device according to the embodiment.

Next, the configuration of the control device of the film thickness measuring device according to the embodiment will be described by using FIG. 3. FIG. 3 is a block diagram showing the control device of the film thickness measuring device according to the embodiment.

A data bus 100 performs exchange of data between a central processing unit (CPU) 103 and individual sections such as an interface (I/F) 101. The I/F 101 is a port for input and output of signals and data. To the I/F 101, the lock-in amplifier 5, the actuators 73 and 74, and the optical delay section 13 are connected. The control device 6 is capable of changing the timing at which the pump light beam reaches the terahertz wave generator 19 by controlling the positions of the movable mirrors 35 and 36 of the optical delay section 13. In addition, the control device 6 is capable of appropriately rotating the polarizing plates 20 and 22 to switch between the S wave and the P wave by controlling the actuators 73 and 74.

A resister 102 is a memory for temporarily storing data as a cache register for the operation of the CPU 103. The CPU 103 executes a predetermined inspection program to control the optical device 2 and analyze the measurement data.

A read-only memory (ROM) 105 is used to store a basic program such as a BIOS of the control device 6. A random-access memory (RAM) 106 is used as a work area for executing the inspection program. A storage device (external storage device, database) 107 is a hard disk drive, a CD drive, or a DVD drive, and is used to store measured inspection data and the like. A display 108 is, e.g., a liquid crystal display device, and is capable of displaying a graph of the time waveform of the terahertz wave based on the inspection data, and the film thickness and the coating quality of the sample 3.

Figure 4:
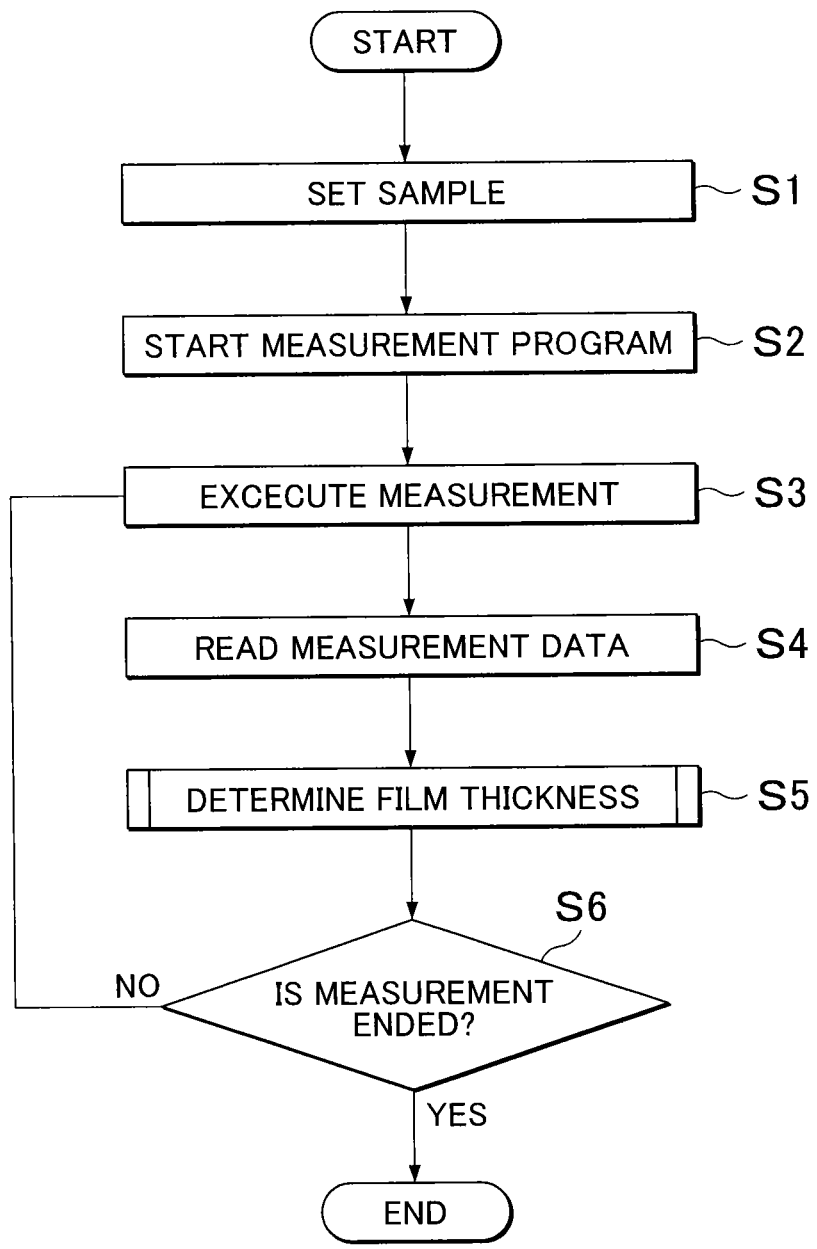
FIG. 4 is a flowchart showing an outline of a film thickness measuring method according to the embodiment.

Next, the outline of the film thickness measuring method that uses the film thickness measuring device according to the embodiment will be described by using FIG. 4. FIG. 4 is a flowchart showing the outline of the film thickness measuring method according to the embodiment.

First, the sample 3 serving as the measurement target is set in the optical device 2 (step S1). Specifically, the abutment surface 70 of the prism 21 is caused to abut the surface of the sample 3. In the embodiment, only by causing the abutment surface 70 of the prism 21 to abut the surface of the sample 3, it is possible to adjust the angle of the sample 3 with respect to the optical device 2. When an operator operates the control device 6 to start the inspection program, the CPU 103 executes the inspection program stored in the storage device 107 to initialize the optical device 2, the lock-in amplifier 5, and the control device 6 (step S2).

Next, the control device 6 executes the measurement (step S3). The laser light beam outputted from the laser oscillator 10 is split into the pump light beam and the probe light beam by the BS 11. The pump light beam is caused to enter the modulator 12. The modulator 12 modulates the pump light beam using a predetermined modulation frequency. The modulated pump light beam is amplified by using the optical fiber amplifier 16 and the like via the optical delay section 13, and is caused to enter the terahertz wave generator 19 via the condenser lens 40. The terahertz wave emitted from the terahertz wave generator 19 is applied to the sample 3 via the prism 21. The terahertz wave (reflected wave) reflected at the sample 3 is caused to enter the terahertz wave detector 23 via the prism 21 and is detected by the terahertz wave detector 23. The pulse of the terahertz wave (reflected wave) is caused to enter the terahertz wave detector 23 repeatedly at the frequency of the modulation signal. On the other hand, the probe light beam is amplified by using the optical fiber amplifier 26 and the like, and is applied to the gap between the dipole antennas of the terahertz wave detector 23 via the condenser lens 47. At this point, a weak current proportional to the electric field of the terahertz wave flows in the terahertz wave detector 23, the weak current is amplified by the current amplifier 4, and is further synchronously detected by the lock-in amplifier 5. The lock-in amplifier 5 converts the amplified current to digital data using an A/D converter, and records the digital data in the memory. With this, the intensity of the waveform of the terahertz wave at the predetermined timing is measured.

In the case where sampling is performed on the waveform of the terahertz wave (reflected wave), the electric field strength in the terahertz wave detector 23 is detected while shifting the timing of the probe light beam with respect to the timing of the terahertz wave. That is, the control device 6 drives the movable mirrors 35 and 36 of the optical delay section 13 to set the delay time of the pump light beam to t1. The pump light beam is caused to enter the terahertz wave generator 19, and the electric field strength of the terahertz wave at the delay time t1 at the timing of the probe light beam is detected by the terahertz wave detector 23. Subsequently, the control device 6 sets the delay time in the optical delay section 13 to t2, and the electric field strength of the terahertz wave at the delay time t2 at the timing of the probe light beam is detected by the terahertz wave detector 23. Similarly, by sequentially changing the delay time in the optical delay section 13 in the order of t3, t4, t5 . . . , it becomes possible to perform the sampling of the waveform of the terahertz wave. The control device 6 captures measurement data representing the waveform of the terahertz wave and stores the measurement data in the storage device 107 (step S4).

The control device 6 determines the film thickness based on the measurement data (step S5). The measurement result obtained in this manner is displayed in the display 108. In the case where the measurement is continuously performed after the above process is executed (NO in step S6), the control device 6 repeatedly executes the process in steps S4 to S5. On the other hand, in the case where the measurement is ended (YES in step S6), the control device 6 ends the process.

Figure 5:
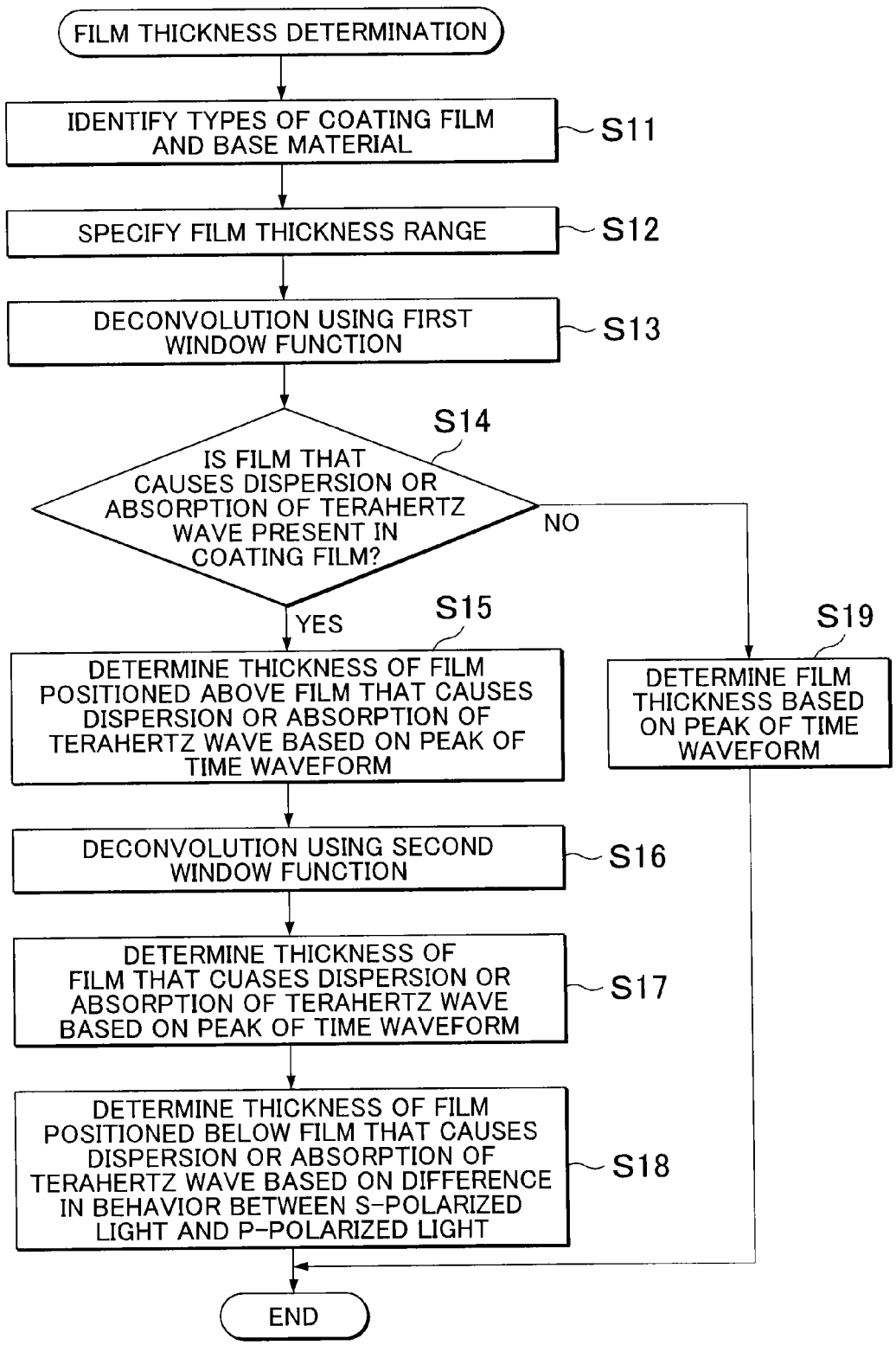
FIG. 5 is a flowchart showing a film thickness determination process in the film thickness measuring device according to the embodiment.

Next, a film thickness determination process (step S5) in the film thickness measuring device according to the embodiment will be described by using FIG. 5. FIG. 5 is a flowchart showing the film thickness determination process in the film thickness measuring device according to the embodiment.

Note that the description will be given by taking the case where the thickness of each of the films 31a to 31c in the sample 3 formed with the multi-layer film 32 having the three-layer structure on the base material 30 is measured as an example, but the measurement target (sample) 3 is not limited thereto, and various measurement targets can be measured.

First, the operator inputs the types of the multi-layer film 32 and the base material 30 according to an operation menu displayed in the display 108 of the control device 6 (step S11). The control device 6 displays a pulldown menu for selecting, e.g., the number of films 31a to 31c constituting the multi-layer film 32, the type of each of the films 31a to 31c constituting the multi-layer film 32, and the type of the base material 30 in the display 108. The operator selects, e.g., 3 as the number of films 31a to 31c constituting the multi-layer film 32. In addition, the operator selects, e.g., the conductive primer layer as the type of the film 31a as the first layer, inputs, e.g., the metallic base layer as the type of the film 31b as the second layer, and selects, e.g., the clear layer as the type of the film 31c as the third layer.

Further, the operator inputs the possible thickness range of each of the films 31a to 31c according to the operation menu displayed in the display 108 of the control device 6 (step S12). The thickness range of each of the films 31a to 31c is determined by inputting the minimum value and the maximum value.

Figure 6A:
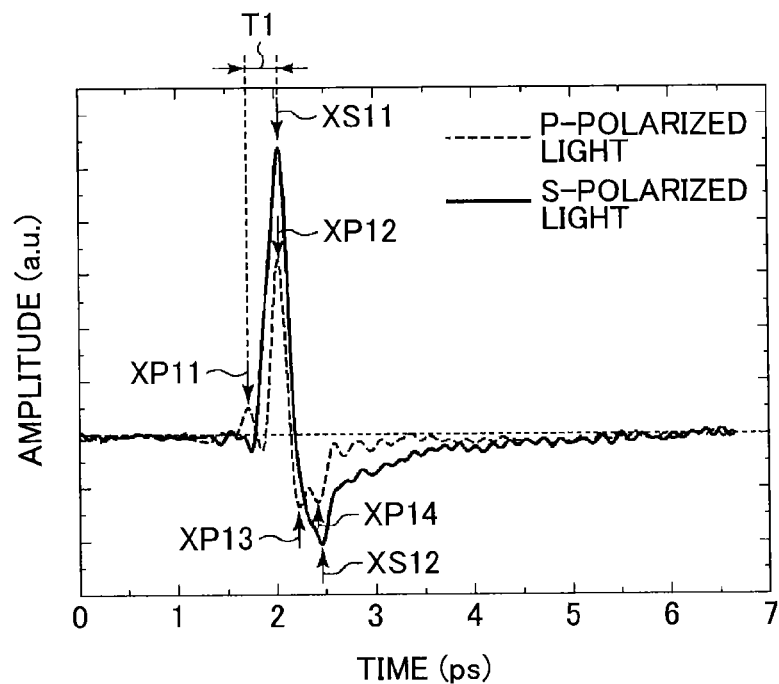
FIGS. 6A and 6B are graphs each showing a time waveform after a deconvolution process is performed.

Next, the control device 6 performs a deconvolution process (first deconvolution filter process) on waveform data (time waveform data) by using a window function (first window function) (step S13). As the first window function, for example, a Gaussian window is used. Herein, for example, a relatively wide Gaussian window is used as the window function. More specifically, for example, the relatively wide Gaussian window with which the pulse width of the terahertz wave after the deconvolution process becomes relatively short is used. For example, the Gaussian window with which the pulse width of the terahertz wave after the deconvolution process is about 150 fs is used. FIG. 6A is a graph showing the time waveform after the deconvolution process is performed by using the first window function. The horizontal axis in each of FIGS. 6A and 6B indicates time, and the vertical axis in each of FIGS. 6A and 6B indicates the amplitude of the waveform. A broken line in each of FIGS. 6A and 6B indicates the P-polarization component, and a solid line in each of FIGS. 6A and 6B indicates the S-polarization component.

In the case where a film that causes the dispersion or absorption of the terahertz wave is present in the multi-layer film 32 (YES in step S14), the thickness of the film 31c positioned above the film 31b that causes the dispersion or absorption of the terahertz wave is determined based on the peak of the time waveform (step S15). Specifically, first, the peaks are detected by scanning the waveform data on the P-polarized light and the S-polarized light having been subjected to the deconvolution process by using the first window function. As a result, for example, the peaks shown in FIG. 6A are detected. In the waveform data on the S-polarization component, for example, a maximum value XS11 and a minimum value XS12 are detected. In the waveform data on the P-polarization component, for example, a maximum value X1311, a maximum value XP12, a minimum value XP13, and a minimum value XP14 are detected. In the case where the film 31a as the first layer is the conductive primer layer, the film 31b as the second layer is the metallic base layer, and the film 31c as the third layer is the clear layer, it is proved that the reflection at the interface between the film 31b as the second layer and the film 31c as the third layer has the highest maximum value by measurement of a sample specimen that has been performed in advance. Consequently, the control device 6 determines that the maximum value XS11 and the maximum value XP12 correspond to the reflected wave at the interface between the film 31b as the second layer and the film 31c as the third layer. It is proved that the maximum value that appears before the maximum values XS11 and XP12 corresponds to the reflected wave at the interface between the film 31c as the third layer and the abutment surface 70 of the prism 21 by the measurement of the sample specimen that has been performed in advance. Consequently, the control device 6 determines that the maximum value XP11 corresponds to the reflected wave at the interface between the film 31c as the third layer and the prism 21. The control device 6 determines the thickness of the film 31c as the third layer based on a time difference T1 between the timing of the maximum value XP11 and the timing of the maximum value XP12. The relationship between the time difference T1 and the thickness of the film 31c as the third layer is determined by the measurement of the sample specimen that has been performed in advance. Consequently, it is possible to determine the thickness of the film 31c as the third layer based on the time difference T1. Note that, herein, the thickness of the film 31c as the third layer is determined based on the difference between the timing of the maximum value XP11 and the timing of the maximum value XP12, but the embodiment is not limited thereto. For example, the thickness of the film 31c as the third layer may also be determined based on the time difference between the timing of the maximum value XP11 and the timing of the maximum value XS11.

Figure 6B:
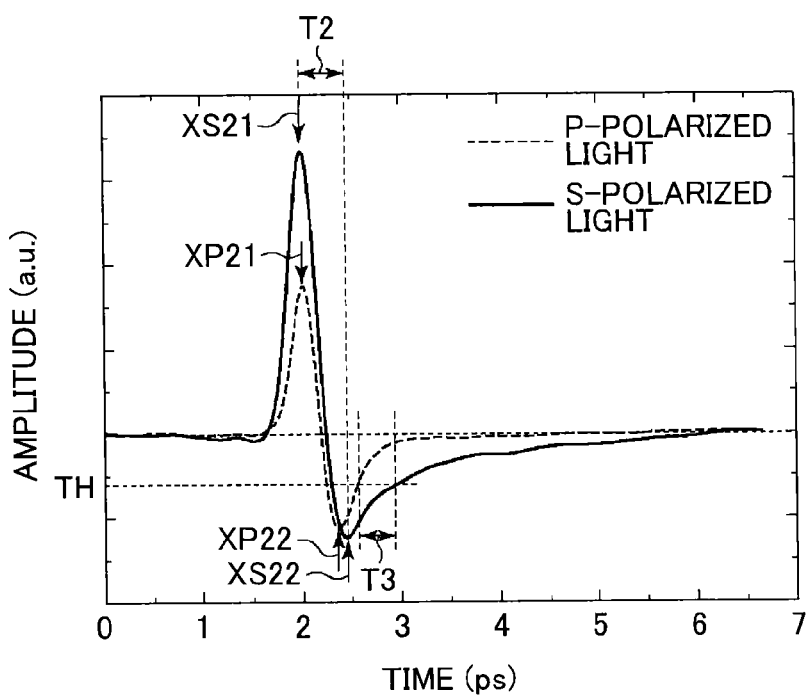

Next, the control device 6 performs a deconvolution process (second deconvolution filter process) on the waveform data (time waveform data) by using a second window function different from the first window function in step S13 (step S16). As the second window function, for example, the Gaussian window is used. Herein, as the window function, for example, a relatively narrow Gaussian window is used. More specifically, for example, the relatively narrow Gaussian window with which the pulse width of the terahertz wave after the second deconvolution filter process is relatively large is used. For example, the Gaussian window with which the pulse width of the terahertz wave after the second deconvolution filter process is about 300 fs is used. FIG. 6B is a graph showing the time waveform after the deconvolution process is performed by using the second window function.

Next, the thickness of the film 31b that causes the dispersion or absorption of the terahertz wave is determined based on the peak of the time waveform after the second deconvolution filter process is performed (step S17). Specifically, first, the peaks are detected by scanning the waveform data on the P-polarized light and the waveform data on the S-polarized light after the second deconvolution process is performed. As a result, for example, the peaks shown in FIG. 6B are detected. In the waveform data on the S-polarization component, for example, a maximum value XS21 and a minimum value XS22 are detected. In the waveform data on the P-polarization component, for example, a maximum value XP21 and a minimum value XP22 are detected. In the case where the film 31a as the first layer is the conductive primer layer, the film 31b as the second layer is the metallic base layer, and the film 31c as the third layer is the clear layer, it is proved that the reflection at the interface between the film 31b as the second layer and the film 31c as the third layer has the highest maximum value by the measurement of the sample specimen that has been performed in advance. Consequently, the control device 6 determines that the maximum value XS21 and the maximum value XP21 correspond to the reflected wave at the interface between the film 31b as the second layer and the film 31c as the third layer. It is proved that the minimum value that appears after the maximum values XS21 and XP21 corresponds to the reflected wave at the interface between the film 31b as the second layer and the film 31a as the first layer by the measurement of the sample specimen that has been performed in advance. Consequently, the control device 6 determines that the minimum values XP22 and XS22 correspond to the reflected wave at the interface between the film 31a as the first layer and the film 31b as the second layer. The control device 6 determines the thickness of the film 31b as the second layer based on, e.g., a time difference T2 between the timing of the maximum value XS21 and the timing of the minimum value XS22. The relationship between the time difference T2 and the thickness of the film 31*b* as the second layer is determined by the measurement of the sample specimen that has been performed in advance. Consequently, it is possible to determine the thickness of the film 31*b* as the second layer based on the time difference T2. Note that, herein, the thickness of the film 31*b* as the second layer is determined based on the difference between the timing at which the S-polarized light has the maximum value XS21 and the timing at which the S-polarized light has the minimum value XS22, but the embodiment is not limited thereto. For example, the thickness of the film 31*b* as the second layer may also be determined based on the time difference between the timing at which the P-polarized light has the maximum value XP21 and the timing at which the P-polarized light has the minimum value XP22.

Next, the thickness of the film 31*a* positioned below the film 31*b* that causes the dispersion or absorption of the terahertz wave is determined based on a difference between the time waveform (behavior) of the S-polarization component and the time waveform (behavior) of the P-polarization component after the second deconvolution filter process is performed (step S18). Specifically, the thickness of the film 31*a* as the first layer is determined based on a time difference T3 between the timing at which the waveform of the P-polarization component reaches a threshold value TH and the timing at which the waveform of the S-polarization component reaches the threshold value TH. As described above, since the incident angle θ4 of the terahertz wave at the interface between the film 31*a* as the first layer and the base material 30 is set to a large value, the reflectance of the P-polarized light at the interface between the film 31*a* as the first layer and the base material 30 is sufficiently reduced, or the phase of the P-polarized light reflected at the interface between the film 31*a* as the first layer and the base material 30 is inverted. Accordingly, the sufficient reduction of the reflectance of the P-polarized light or the inversion of the phase of the P-polarized light at the interface between the film 31*a* as the first layer and the base material 30 contributes to advancing of the timing at which the P-polarized light reaches the threshold value TH. Consequently, the time difference T3 between the timing at which the waveform of the P-polarized light reaches the threshold value TH and the timing at which the waveform of the S-polarized light reaches the threshold value TH is significant. The relationship between the time difference T3 and the thickness of the film 31*a* as the first layer is determined by the measurement of the sample specimen that has been performed in advance. Consequently, it is possible to determine the thickness of the film 31*a* as the first layer based on the time difference T3. Note that the threshold value TH is not limited to the threshold value TH shown in FIG. 6A, and can be set appropriately.

In the case where the film that causes the dispersion or absorption of the terahertz wave is not present in the multi-layer film 32 (NO in step S14), the thickness of each of the films 31*a* to 31*c* of the multi-layer film 32 may be determined based on the peak of the time waveform (step S19).

Thus, the control device 6 is capable of determining the thickness of each of the films 31*a* to 31*c* more accurately.

Figure 7:
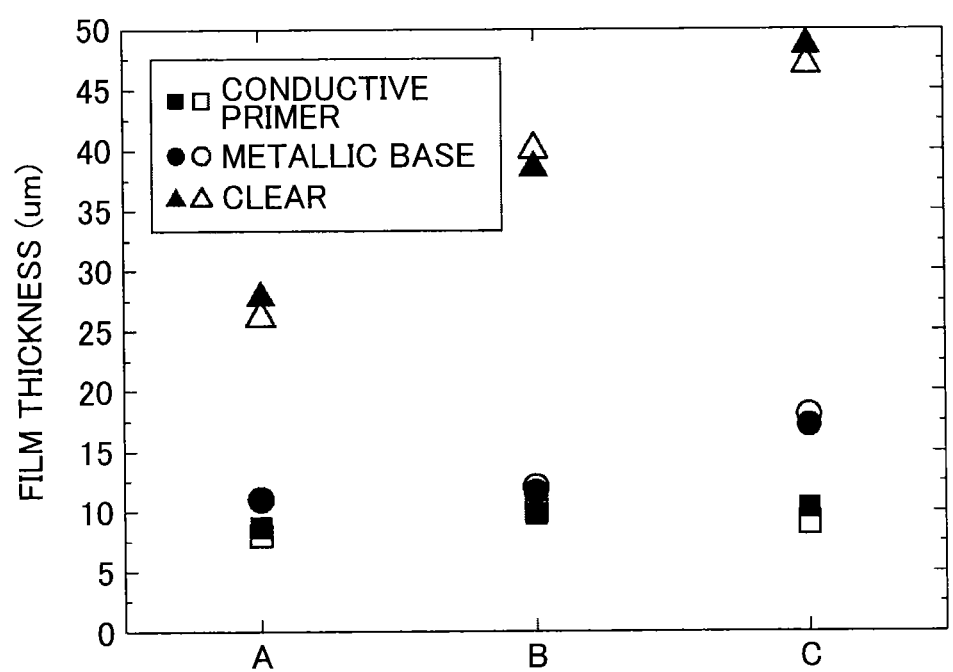
FIG. 7 is a graph showing an evaluation result of the film thickness measuring method according to the embodiment.

Next, the evaluation result of the film thickness measuring method according to the embodiment will be described by using FIG. 7. FIG. 7 is a graph showing the evaluation result of the film thickness measuring method according to the embodiment. A group of data A, a group of data B, and a group of data C in FIG. 7 represent evaluation results of Samples A, B, and C. The vertical axis in FIG. 7 indicates the film thickness. A filled-in square in FIG. 7 indicates the thickness of the conductive primer layer 31*a* measured by the film thickness measuring method according to the embodiment. An open square in FIG. 7 indicates the thickness of the conductive primer layer 31*a* measured by a destructive test. A filled-in circle in FIG. 7 indicates the thickness of the metallic base layer 31*b* measured by the film thickness measuring method according to the embodiment. An open circle in FIG. 7 indicates the thickness of the metallic base layer 31*b* measured by the destructive test. A filled-in triangle in FIG. 7 indicates the thickness of the clear layer 31*c* measured by the film thickness measuring method according to the embodiment. An open triangle in FIG. 7 indicates the thickness of the clear layer 31*c* measured by the destructive test.

As can be seen from FIG. 7, a difference between the thickness of each layer measured by the film thickness measuring method according to the embodiment and the thickness of each layer measured by the destructive test is extremely small.

From this, it can be seen that the thickness of each layer can be measured with extremely high accuracy according to the embodiment.

Thus, according to the embodiment, since the terahertz wave is applied to the sample 3 via the prism 21, it is possible to cause the terahertz wave to become incident on the interface between the film 31*a* as the first layer and the sample 30 at the relatively large incident angle θ4. Since it is possible to cause the terahertz wave to become incident on the I/F between the film 31*a* as the first layer and the sample 30 at the relatively large incident angle θ4, it is possible to make the significant difference between the time waveform (behavior) of the S-polarization component of the reflected light from the sample 3 and the time waveform (behavior) of the P-polarization component thereof. As a result, according to the embodiment, even in the case where the film 31*b* that causes the dispersion or absorption of the terahertz wave is present in the multi-layer film 32, it is possible to measure the thickness of the film 31*a* as the first layer more accurately and reliably based on the difference between the time waveform (behavior) of the S-polarization component of the reflected wave and the time waveform (behavior) of the P-polarization component of the reflected wave.

In addition, according to the embodiment, it is possible to perform positioning and angle matching only by causing the abutment surface 70 of the prism 21 to abut the surface of the sample 3. That is, according to the embodiment, since it is possible to perform setting accurately and reliably by the simple method, it is possible to perform the measurement of the film thickness at high throughput with high accuracy.

Further, according to the embodiment, since the terahertz wave is applied to the sample 3 via the prism 21 and the reflected wave from the sample 3 is acquired via the prism 21, the distance of propagation of the terahertz wave in the air is extremely short. Accordingly, the absorption of the terahertz wave by the water in the air is small, and it is possible to measure the film thickness accurately and reliably even in the environment in which humidity is high.

Figure 8:
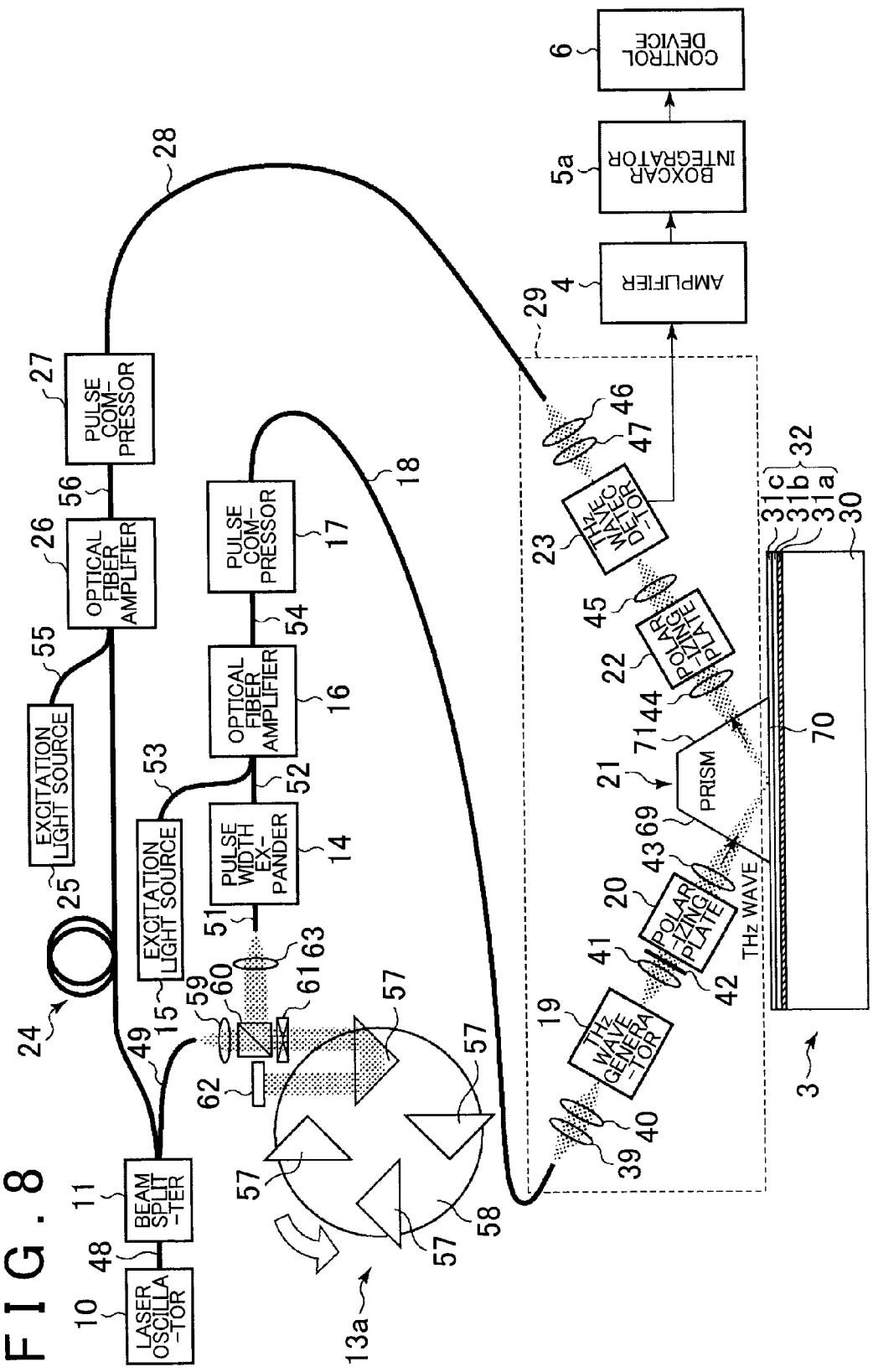
FIG. 8 is a block diagram showing the film thickness measuring device according to a first modification of the embodiment.

A first modification of the film thickness measuring device according to the embodiment will be described by using FIG. 8. FIG. 8 is a block diagram showing the film thickness measuring device according to the modification.

In the film thickness measuring device according to the modification, an optical delay section 13*a* capable of changing the delay time at high speed is provided.

As shown in FIG. 8, a plurality of corner cube prisms 57 are disposed on a circular plate 58. The number of corner cube prisms 57 is set to, e.g., four. It is possible to rotate the circular plate 58 at high speed using a motor (not shown) or the like. The pump light beam having propagated in the optical fiber 49 is collimated by a collimating lens 59, and passes through a polarizing BS 60 and a quarter-wave plate 61. The pump light beam having passed through the quarter-wave plate 61 is reflected by the corner cube prism 57, is further reflected by a mirror 62, is further reflected by the corner cube prism 57, and passes through the quarter-wave plate 61 again. The pump light beam having passed through the quarter-wave plate 61 is reflected by the polarizing BS 60, is condensed by a condenser lens 63, and is introduced into the optical fiber 51. The high-speed optical delay section 13*a* may be disposed in the manner described above. The rotation speed of the motor is set to, e.g., about 1500 rpm. When the rotation speed of the motor is set to, e.g., 1500 rpm, it is possible to perform sweep of the delay time at a repetition period of e.g., 100 Hz.

In the case where the above high-speed optical delay section 13*a* is used, the operation of the lock-in amplifier 5 cannot follow the operation of the optical delay section 13*a*. To cope with this, in the embodiment, a boxcar integrator 5*a* is used. The boxcar integrator 5*a* is a device capable of measuring a high-speed repetitive signal efficiently at a high S/N ratio. The boxcar integrator 5*a* is capable of gating with an arbitrary time width and extracting only a required signal component efficiently.

In the case where the processing speed of the boxcar integrator 5*a* is not sufficiently high, the boxcar integrator 5*a* cannot follow the operation of the optical delay section 13*a*, and hence it is preferable to use the boxcar integrator 5*a* having the sufficiently high processing speed.

Note that, in the modification, the description has been given by taking the case where the corner cube prisms 57 are provided on the circular plate 58 as an example, but the modification is not limited thereto. For example, a plurality of mirrors (not shown) may be disposed on the circular plate 58, and the angles of the mirrors may be appropriately changed by an actuator.

In addition, in the modification, the description has been given by taking the case where the signal having the high S/N ratio is acquired by using the boxcar integrator 5*a* as an example, but the modification is not limited thereto. For example, the signal having the high S/N ratio may be acquired by using, e.g., a signal averager or the like. The signal averager is a device that has a high-speed A/D converter and dedicate hardware mounted thereon, and improves the S/N ratio by averaging a weak signal at high speed.

Thus, the high-speed optical delay section 13*a* may be used and the boxcar integrator 5*a* capable of following the operation of the high-speed optical delay section 13*a* may be used. According to the modification, it becomes possible to provide the film thickness measuring device capable of measuring the film thickness at higher speed.

Figure 9:
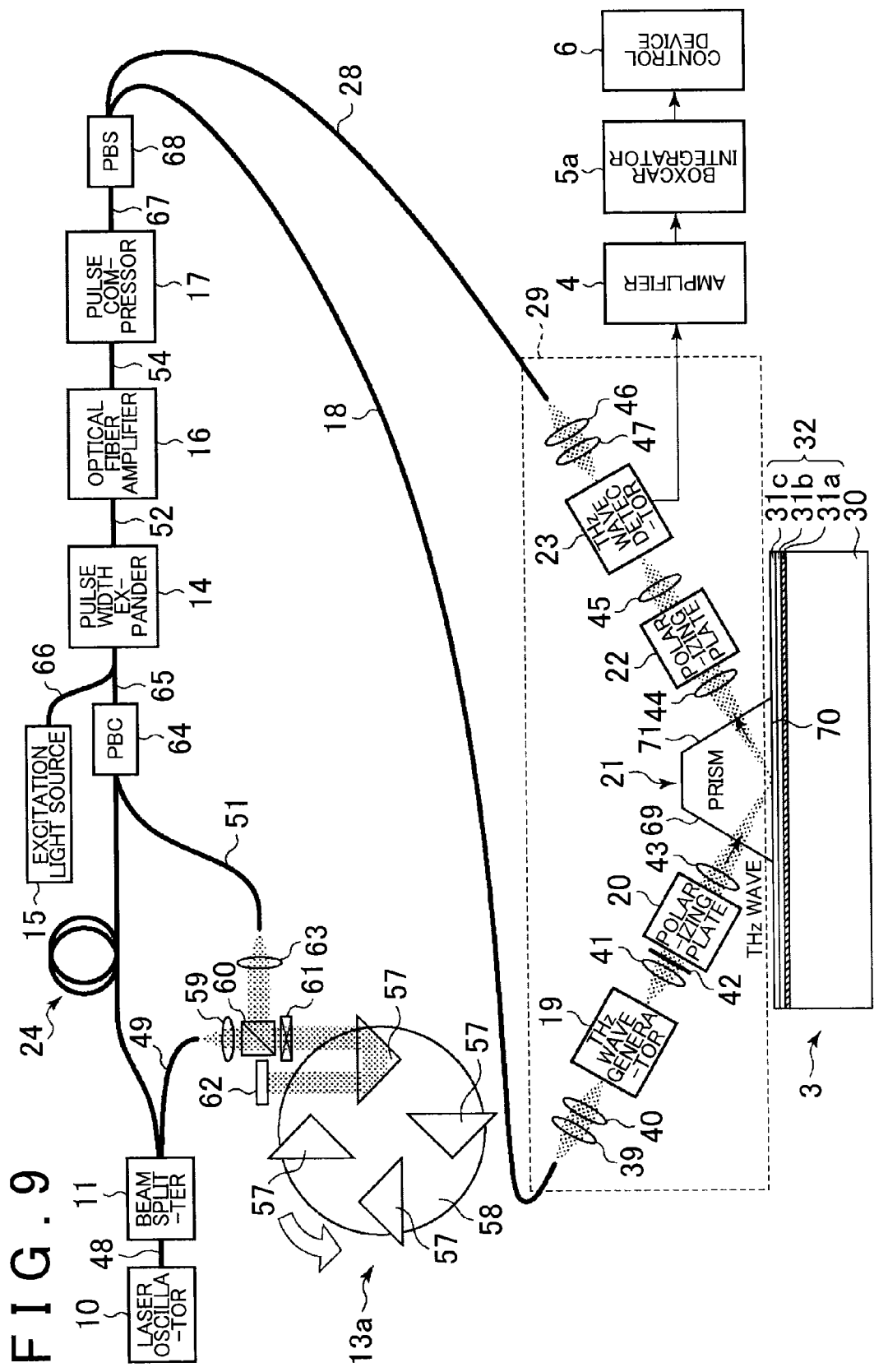
FIG. 9 is a block diagram showing the film thickness measuring device according to a second modification of the embodiment.

A second modification of the film thickness measuring device according to the embodiment will be described by using FIG. 9. FIG. 9 is a block diagram showing the film thickness measuring device according to the modification.

In the film thickness measuring device according to the modification, the common optical fiber amplifier is used as the optical fiber amplifier that amplifies the pump light beam and the optical fiber amplifier that amplifies the probe light beam, and the common pulse compressor is used as the pulse compressor that compresses the pump light beam and the pulse compressor that compresses the probe light beam.

As shown in FIG. 9, the pump light beam as one of the laser light beams obtained by the splitting by the BS 11 is inputted to a polarization beam combiner (PBC) 64 via the optical delay section 13*a*. In addition, the probe light beam as the other one of the laser light beams obtained by the splitting by the BS 11 is inputted to the PBC 64 via the optical fiber 24 for the optical path length adjustment. The PBC 64 is a component that combines polarized light beams that are inputted from two optical fibers and are orthogonal to each other, and outputs the polarized light beam obtained by the combination to one optical fiber. When the polarization-holding optical fibers are appropriately used as the optical fibers 24, 48, 49, and 51, it is possible to input the pump light beam and the probe light beam of which the polarization directions are orthogonal to each other to the PBC 64. The pump light beam and the probe light beam inputted to the PBC 64 are combined by the PBC 64. The laser light beam obtained by the combination by the PBC 64 propagates in an optical fiber 65, and is inputted to the pulse width expander 14. In addition, the laser light beam outputted from the excitation light source 15 propagates in an optical fiber 66, and is inputted to the pulse width expander 14. As the optical fibers 65 and 66, it is possible to use, e.g., the polarization-holding optical fiber.

The laser light beam outputted from the pulse width expander 14 propagates in the optical fiber 52, and is inputted to the optical fiber amplifier 16. The laser light beam outputted from the optical fiber amplifier 16 propagates in the optical fiber 54, and is inputted to the pulse compressor 17. The laser light beam outputted from the pulse compressor 17 propagates in an optical fiber 67, and is inputted to a polarizing beam splitter (PBS) 68. As the optical fibers 52, 54, and 67, for example, the polarization-holding optical fibers are used. The PBS 68 is a component that separates two polarized light beams that are orthogonal to each other and outputs the two polarized light beams to two optical fibers. The pump light beam outputted from the PBS 68 propagates in the optical fiber 18. On the other hand, the probe light beam outputted from the PBS 68 propagates in the optical fiber 28.

Thus, the common optical fiber amplifier may be used as the optical fiber amplifier that amplifies the pump light beam and the optical fiber amplifier that amplifies the probe light beam, and the common pulse compressor may be used as the pulse compressor that compresses the pump light beam and the pulse compressor that compresses the probe light beam. According to the modification, since the optical fiber amplifier 16 is used as the common optical fiber amplifier and the pulse compressor 17 is used as the common pulse compressor, it is possible to contribute to a reduction in cost.

Figure 10:
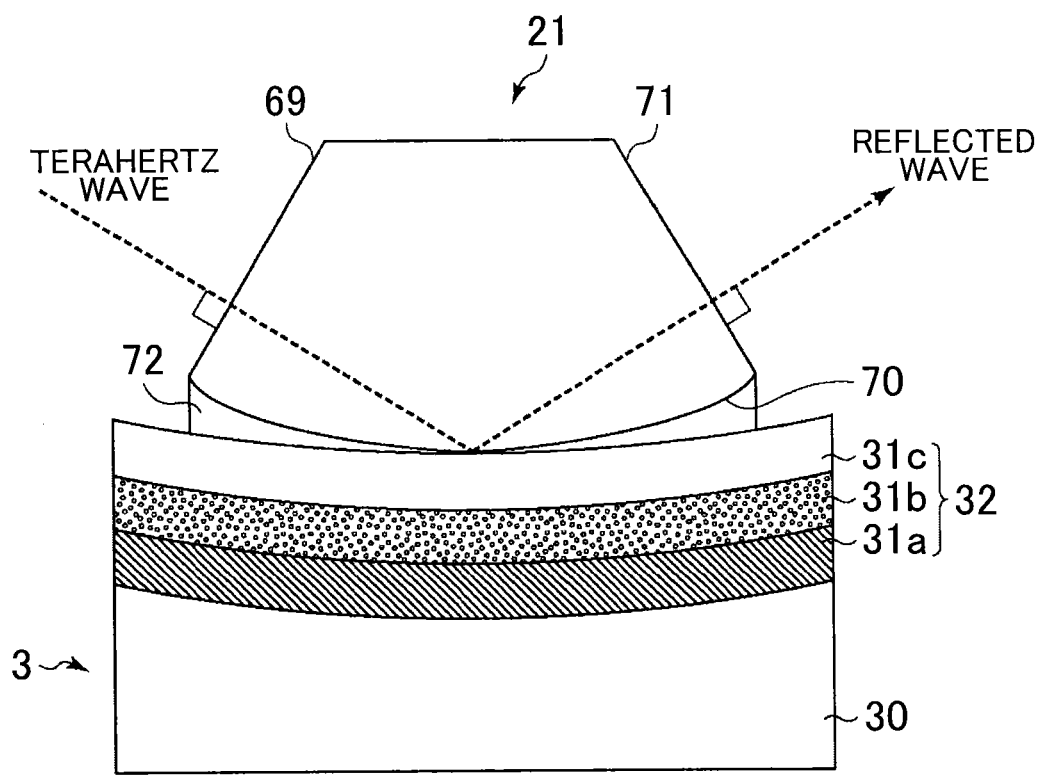
FIG. 10 is a sectional view showing part of the film thickness measuring device according to a third modification of the embodiment.

A third modification of the film thickness measuring device according to the embodiment will be described by using FIG. 10. FIG. 10 is a sectional view showing part of the film thickness measuring device according to the modification.

In the film thickness measuring device according to the modification, a member 72 for filling in a gap between the abutment surface 70 of the prism 21 and the surface of the sample 3 is sandwiched between the abutment surface 70 of the prism 21 and the surface of the sample 3.

As shown in FIG. 10, in the modification, the surface of the sample 3 is curved concavely. When the surface of the sample 3 is curved concavely, in the case where it is intended that the prism 21 having the flat abutment surface 70 is caused to abut the sample 3, a gap is formed between the abutment surface 70 of the prism 21 and the surface of the sample 3. In the case where the gap between the abutment surface 70 of the prism 21 and the surface of the sample 3 is too large to be ignored for the wavelength of the terahertz wave, the terahertz wave is totally reflected at the abutment surface 70 of the prism 21, and it becomes difficult to apply the terahertz wave to the sample 3. To cope with this, in the modification, the abutment surface 70 of the prism 21 is curved convexly. According to the modification, since the abutment surface 70 of the prism 21 is curved convexly, it is possible to reliably cause the abutment surface 70 of the prism 21 to abut the surface of the sample 3. Consequently, according to the modification, even in the case where the surface of the sample 3 is curved concavely, it becomes possible to apply the terahertz wave to the sample 3 and detect the reflected wave from the sample 3.

Incidentally, in the case where the curvature of the abutment surface 70 of the prism 21 is different from that of the surface of the sample 3, the abutment surface 70 of the prism 21 abuts the surface of the sample 3 only partially, and a gap is formed between the abutment surface 70 of the prism 21 and the surface of the sample 3. In the case where the gap between the abutment surface 70 of the prism 21 and the surface of the sample 3 is too large to be ignored for the wavelength of the terahertz wave, there are cases where it is not possible to reliably perform the application of the terahertz wave to the sample 3 and the detection of the reflected wave from the sample 3. To cope with this, in the case where it is assumed that the curvature of the abutment surface 70 of the prism 21 is different from that of the surface of the sample 3, it is preferable to use the member (refractive index matching member) 72 that fills in the gap between the abutment surface 70 of the prism 21 and the surface of the sample 3.

The member 72 for filling in the gap between the abutment surface 70 of the prism 21 and the surface of the sample 3 preferably satisfies the following conditions. That is, the transmittance of the terahertz wave in the member 72 is preferably substantially equal to that of the terahertz wave in the prism 21. In addition, the refractive index of the member 72 is preferably substantially equal to that of the prism 21. When the member 72 satisfying the above conditions is sandwiched between the abutment surface of the prism 21 and the surface of the sample 3, it is possible to apply the terahertz wave to the sample 3 more reliably, and detect the reflected wave from the sample 3 more reliably.

Note that the transmittance of the terahertz wave in the member 72 is not limited to being equal to that of the terahertz wave in the prism 21. Even when the transmittance of the terahertz wave in the member 72 is different from that of the terahertz wave in the prism 21 to a certain degree, it is possible to apply the terahertz wave to the sample 3 and detect the reflected wave from the sample 3. In addition, the refractive index of the member 72 is not limited to being equal to that of the prism 21. Even when the refractive index of the member 72 is different from that of the prism 21 to a certain degree, it is possible to apply the terahertz wave to the sample 3 and detect the reflected wave from the sample 3.

As the material of the member 72, it is preferable to use, e.g., a gel body or a sheet body as a material having small hardness and high flexibility. Such a material can fit the shape of the surface of the sample 3 easily, and hence it is possible to fill in the gap between the abutment surface 70 of the prism 21 and the surface of the sample 3 more reliably. In addition, when the prism 21 is disconnected from the sample 3, it is possible to disconnect the member 72 together with the prism 21, and prevent the member 72 from remaining on the sample 3.

Note that the material of the member 72 is not limited to the material having high flexibility and, for example, the material thereof may be a material having low flexibility. For example, the material of the member 72 may be a material similar to that of the prism 21.

In addition, the member 72 is not limited to the solid body such as the gel body or the sheet body and, for example, the member 72 may be a liquid. However, in the case where the member 72 is the liquid, the member 72 remains on the surface of the sample 3 when the prism 21 is disconnected from the sample 3. Accordingly, in the case where the member 72 is the liquid, the member 72 needs to be removed from the sample 3. In terms of saving the trouble of removing the member 72, as described above, the member 72 is preferably the solid body.

Thus, the member 72 for filling in the gap between the abutment surface 70 of the prism 21 and the surface of the sample 3 may be sandwiched between the abutment surface 70 of the prism 21 and the surface of the sample 3. According to the modification, since the gap between the abutment surface 70 of the prism 21 and the surface of the sample 3 is reliably filled with the member 72, it is possible to apply the terahertz wave to the sample 3 more reliably and detect the reflected wave from the sample 3 more reliably.

Figure 11:
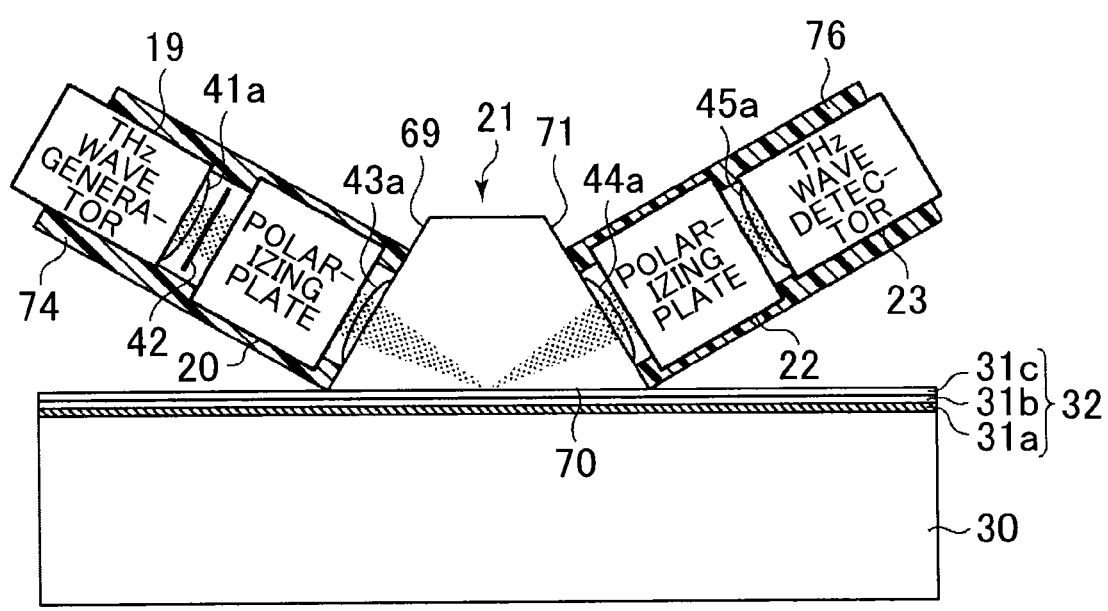
FIG. 11 is a sectional view showing part of the film thickness measuring device according to a fourth modification of the embodiment.

A fourth modification of the film thickness measuring device according to the embodiment will be described by using FIG. 11. FIG. 11 is a sectional view showing part of the film thickness measuring device according to the modification.

In the film thickness measuring device according to the modification, the length of propagation of the terahertz wave in the air is further reduced.

As shown in FIG. 11, to an end surface of the terahertz wave generator 19, a collimating lens 41a is attached. At the subsequent stage of the collimating lens 41a attached to the terahertz wave generator 19, the laser light cut filter 42 is disposed. A distance between the collimating lens 41a and the laser light cut filter 42 is set to, e.g., about 3 mm. At the subsequent stage of the laser light cut filter 42, the polarizing plate 20 is disposed. To the entrance surface 69 of the prism 21, a condenser lens 43a is attached. A distance between the polarizing plate 20 and the condenser lens 43a is set to, e.g., about 3 mm. The terahertz wave generator 19, the laser light cut filter 42, and the polarizing plate 20 are supported by a support member 74, and the support member 74 is fixed to the entrance surface 69 of the prism 21.

To the emission surface 71 of the prism 21, a collimating lens 44a is attached. At the subsequent stage of the prism 21 to which the collimating lens 44a is attached, the polarizing plate 22 is disposed. A distance between the collimating lens 44a and the polarizing plate 22 is set to, e.g., about 3 mm. At the subsequent stage of the polarizing plate 22, the terahertz wave detector 23 to which a condenser lens 45a is attached on an input side is disposed. A distance between the polarizing plate 22 and the condenser lens 45a is set to, e.g., about 3 mm. The polarizing plate 22 and the terahertz wave detector 23 are supported by a support member 76, and the support member 76 is fixed to the emission surface 71 of the prism 21.

Portions of propagation of the terahertz wave in the air include a portion between the collimating lens 41a and the laser light cut filter 42, a portion between the laser light cut filter 42 and the polarizing plate 20, a portion between the collimating lens 44a and the polarizing plate 22, and a portion between the polarizing plate 22 and the condenser lens 45a. The dimensions of each of the portions in the direction of propagation of the terahertz wave are extremely small. As a result, according to the modification, even in the case where water is present in the air in the propagation path of the terahertz wave, the terahertz wave is not significantly absorbed.

Note that, in the modification, the collimating lens 41a is attached to the emission surface of the terahertz wave generator 19, but the terahertz wave generator 19 and the collimating lens 41a may also be integrated with each other. In addition, in the modification, the condenser lens 43a is attached to the entrance surface of the prism 21 and the collimating lens 44a is attached to the emission surface of the prism 21, but the condenser lens 43a and the collimating lens 44a may also be integrated with the prism 21. Further, in the modification, the condenser lens 45a is attached to the entrance surface of the terahertz wave detector 23, but the terahertz wave detector 23 and the condenser lens 45a may also be integrated with each other.

Thus, according to the modification, it is possible to make the distance of propagation of the terahertz wave in the air extremely short. As a result, according to the modification, even in the case where water is present in the air in the propagation path of the terahertz wave, the terahertz wave is not absorbed significantly. Consequently, according to the modification, it is only necessary to perform simple dehumidification of the propagation path of the terahertz wave, and it is also possible to omit the dehumidification of the propagation path of the terahertz wave.

Figure 12A:
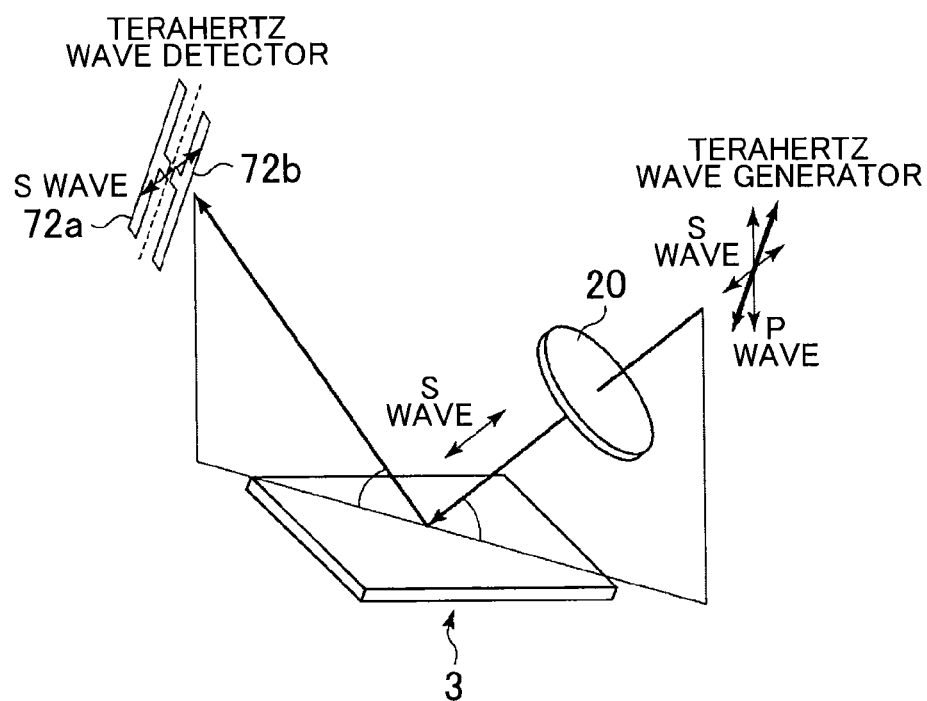
FIGS. 12A and 12B are perspective views each showing part of the film thickness measuring device according to a fifth modification of the embodiment.
Figure 12B:
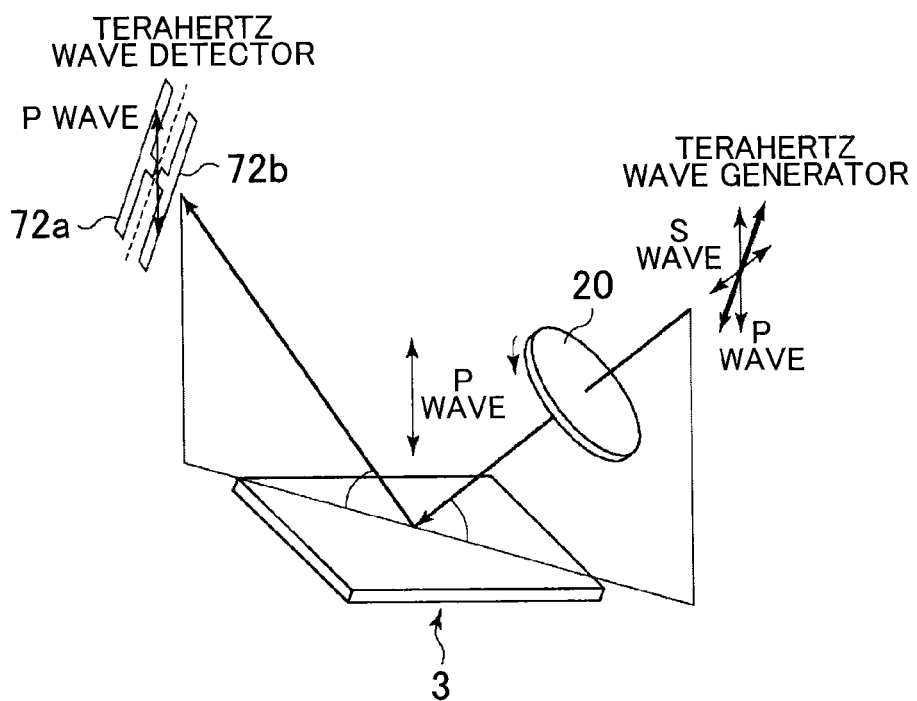

A fifth modification of the film thickness measuring device according to the embodiment will be described by using FIGS. 12A and 12B. FIGS. 12A and 12B are perspective views each showing part of the film thickness measuring device according to the modification. Note that the depiction of the prism 21 is omitted in FIGS. 12A and 12B.

In the film thickness measuring device according to the modification, switching between the S wave and the P wave is performed by using the polarizing plate 20 disposed between the terahertz wave generator 19 and the prism 21.

In the modification, the polarizing plate 20 is disposed between the terahertz wave generator 19 and the prism 21, but the polarizing plate 22 (see FIG. 1) is not disposed between the prism 21 and the terahertz wave detector 23. The inclination of the polarization of the terahertz wave emitted from the terahertz wave generator 19 is set to 45 degrees. The inclination of the polarization of the terahertz wave emitted from the terahertz wave generator 19 is set to 45 degrees in order to allow well-balanced application of the S wave and the P wave. In the modification, the inclinations of dipole antennas 72a and 72b of the terahertz wave detector 23 are set to 45 degrees. A dotted line in each of FIGS. 12A and 12B indicates the direction of the gap between the dipole antennas 72a and 72b. The inclinations of the dipole antennas 72a and 72b of the terahertz wave detector 23 are set to 45 degrees in order to allow well-balanced detection of the S wave and the P wave.

FIG. 12A is a schematic diagram showing the case where the angle of the polarizing plate 20 is set so as to allow the passage of the S wave. Since the angle of the polarizing plate 20 is set so as to allow the passage of only the S wave, only the S wave is applied to the sample 3. Subsequently, the S wave reflected at the sample 3 reaches a pair of the dipole antennas 72a and 72b of the terahertz wave detector 23. Consequently, the terahertz wave detector 23 is capable of detecting the S wave reflected at the sample 3.

FIG. 12B is a schematic diagram showing the case where the angle of the polarizing plate 20 is set so as to allow the passage of the P wave. When the polarizing plate 20 is rotated by 90 degrees in the state of FIG. 12A, it is possible to set the polarizing plate 20 such that the passage of only the P wave is allowed. Note that it is possible to rotate the polarizing plate 20 by using, e.g., an actuator (not shown). It is possible to control the actuator by, e.g., the control device 6. Since the angle of the polarizing plate 20 is set so as to allow the passage of only the P wave, only the P wave is applied to the sample 3. Subsequently, the P wave reflected at the sample 3 reaches the pair of the dipole antennas 72a and 72b of the terahertz wave detector 23. The terahertz wave detector 23 detects the P wave reflected at the sample 3.

Note that the switching between the P wave and the S wave is performed by rotating the polarizing plate 20 in the modification, but the modification is not limited thereto. The polarizing plate may be switched between the polarizing plate that allows the passage of only the P wave and the polarizing plate that allows the passage of only the S wave. It is possible to perform the switching between the polarizing plate that allows the passage of only the P wave and the polarizing plate that allows the passage of only the S wave by using, e.g., an actuator (not shown). It is possible to control the actuator by, e.g., the control device 6.

Thus, according to the modification as well, it is possible to switch between the P wave and the S wave to apply the P wave or the S wave to the sample 3.

Figure 13A:
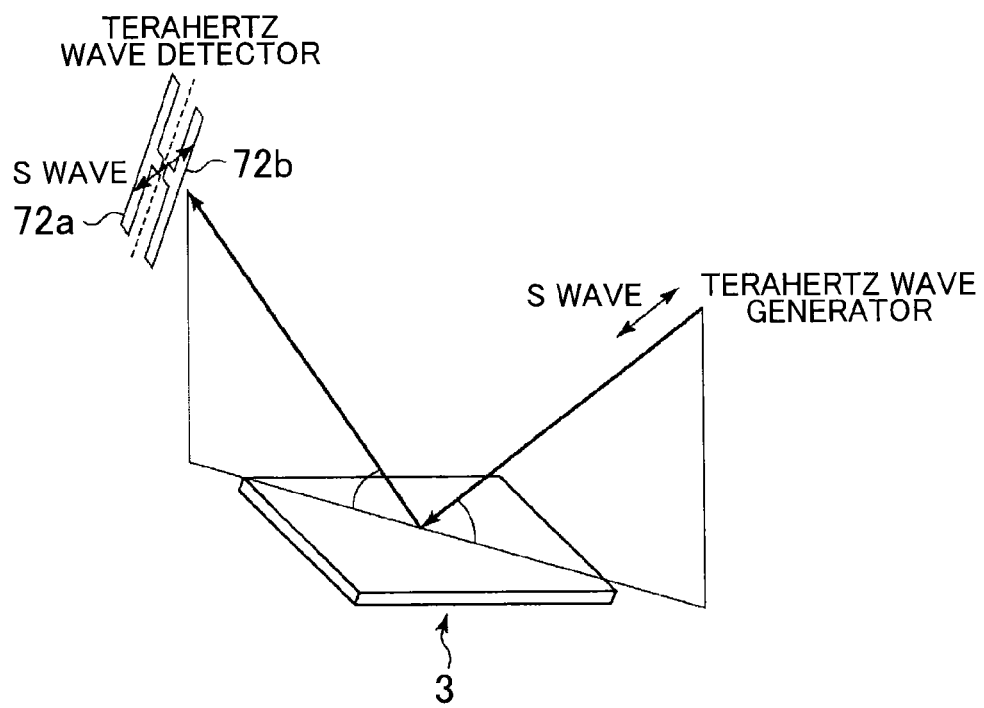
FIGS. 13A and 13B are perspective views each showing part of the film thickness measuring device according to a sixth modification of the embodiment.
Figure 13B:
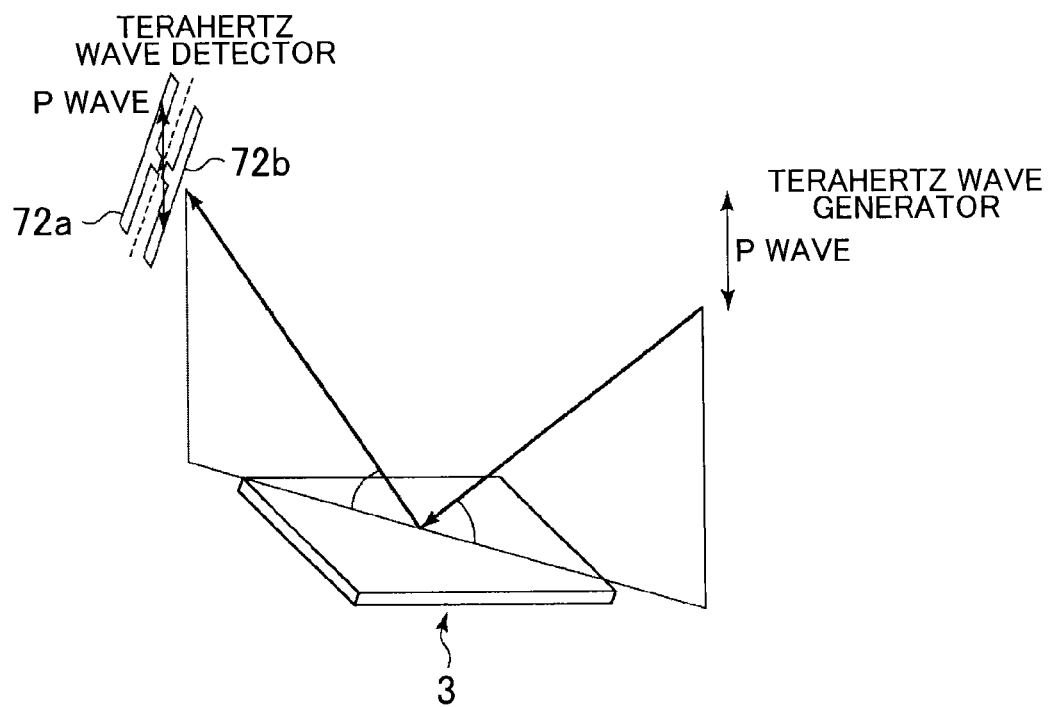

A sixth modification of the film thickness measuring device according to the embodiment will be described by using FIGS. 13A and 13B. FIGS. 13A and 13B are perspective views each showing part of the film thickness measuring device according to the modification. Note that the depiction of the prism 21 is omitted in FIGS. 13A and 13B.

In the film thickness measuring device according to the modification, the switching between the S wave and the P wave is performed by rotating the terahertz wave generator 19. In the modification, the polarizing plate 20 (see FIG. 1) is not disposed between the terahertz wave generator 19 and the prism 21, and the polarizing plate 22 (see FIG. 1) is not disposed between the prism 21 and the terahertz wave detector 23. In the modification, the inclinations of the dipole antennas 72a and 72b of the terahertz wave detector 23 are set to 45 degrees. The inclinations of the dipole antennas 72a and 72b of the terahertz wave detector 23 are set to 45 degrees in order to allow well-balanced detect of the S wave and the P wave.

FIG. 13A is a schematic diagram showing the case where the angle of the terahertz wave generator 19 is set so as to allow the emission of only the S wave from the terahertz wave generator 19. Since the angle of the terahertz wave generator 19 is set so as to allow the emission of only the S wave, only the S wave is applied to the sample 3. Subsequently, the S wave reflected at the sample 3 reaches the pair of the dipole antennas 72a and 72b of the terahertz wave detector 23. Consequently, the terahertz wave detector 23 is capable of detecting the S wave reflected at the sample 3.

FIG. 13B is a schematic diagram showing the case where the angle of the terahertz wave generator 19 is set so as to allow the emission of only the P wave from the terahertz wave generator 19. When the terahertz wave generator 19 is rotated by 90 degrees in the state of FIG. 13A, it is possible to set the terahertz wave generator 19 such that the emission of only the P wave is allowed. Note that it is necessary to rotate the polarization of the pump light beam caused to enter the terahertz wave generator 19 similarly to the polarization of the terahertz wave, and hence it is preferable to rotate the terahertz wave generator 19 and the optical fiber 18 together. Since the angle of the terahertz wave generator 19 is set so as to allow the emission of only the P wave, only the P wave is applied to the sample 3. Subsequently, the P wave reflected at the sample 3 reaches the pair of the dipole antennas 72a and 72b of the terahertz wave detector 23. Consequently, the terahertz wave detector 23 is capable of detecting the P wave reflected at the sample 3.

Note that, in the modification, the description has been given by taking the case where the switching between the S wave and the P wave is performed by rotating the terahertz wave generator 19 as an example, but the modification is not limited thereto. For example, the switching between the S wave and the P wave may be performed by disposing the half-wave plate for the terahertz wave at the subsequent stage of the terahertz wave generator 19 and appropriately setting the rotation angle of the half-wave plate.

Thus, according to the modification as well, it is possible to switch between the P wave and the S wave to apply the P wave or the S wave to the sample 3.

Figure 14A:
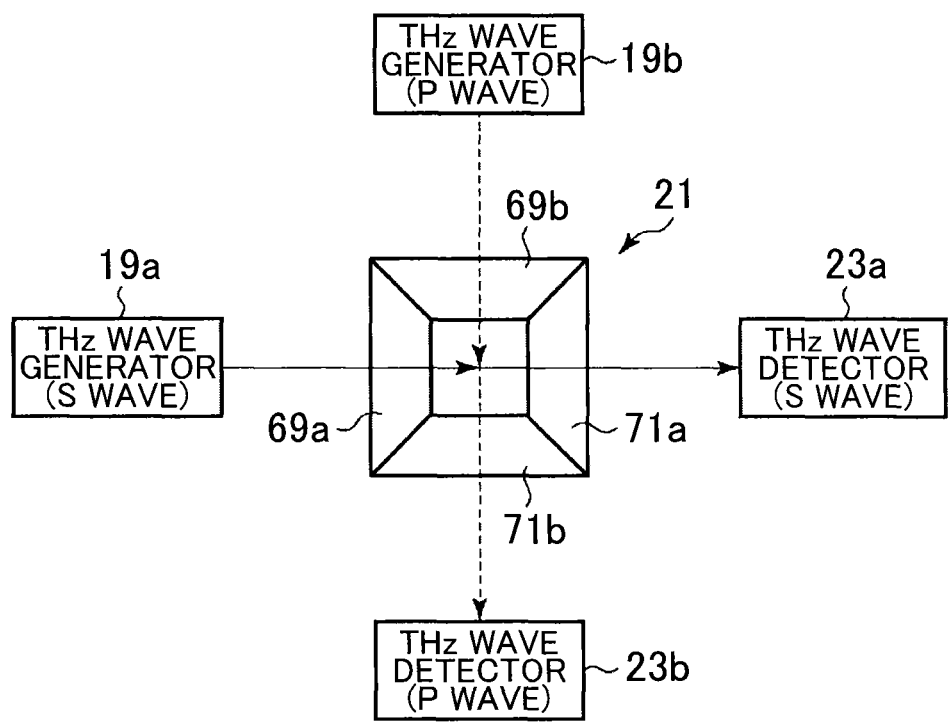
FIGS. 14A and 14B are a plan view and a sectional view each showing part of the film thickness measuring device according to a seventh modification of the embodiment.
Figure 14B:
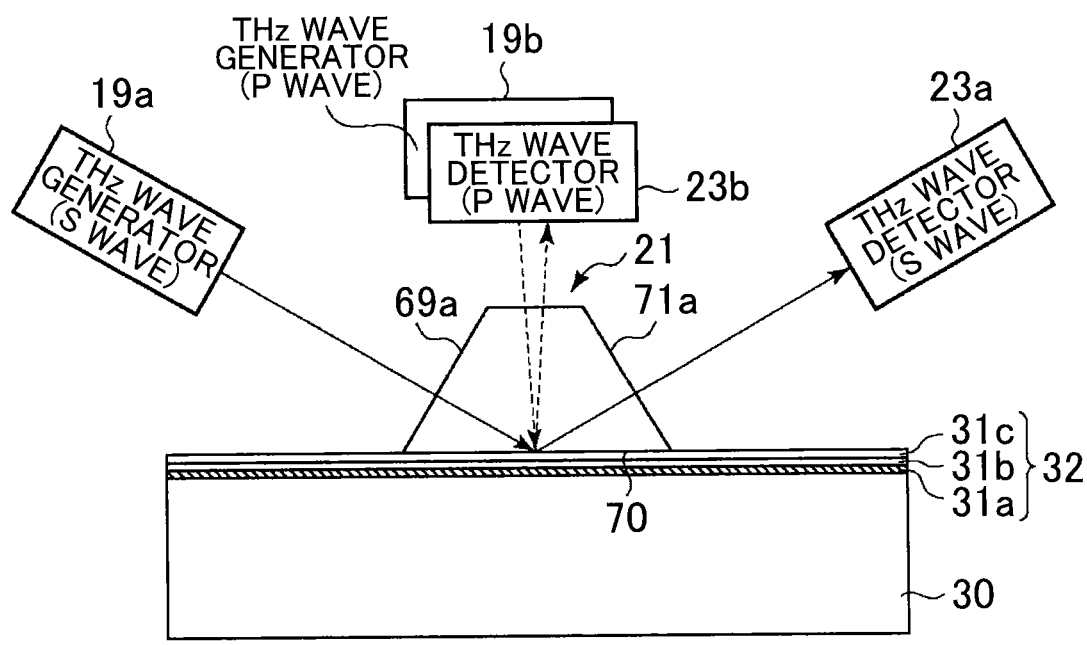

A seventh modification of the film thickness measuring device according to the embodiment will be described by using FIGS. 14A and 14B. FIG. 14A is a plan view showing part of the film thickness measuring device according to the modification, and FIG. 14B is a sectional view corresponding to FIG. 14A.

In the film thickness measuring device according to the modification, a terahertz wave generator 19a for emitting the P wave and a terahertz wave generator 19b for emitting the S wave are disposed separately. In the modification, a terahertz wave detector 23a for detecting the P wave reflected at the sample 3 and a terahertz wave detector 23b for detecting the S wave reflected at the sample 3 are disposed separately. The shape of the prism 21 is, e.g., a truncated square pyramid and, more specifically a right truncated square pyramid. When viewed in plan view, the terahertz wave generator 19a is disposed on the left side of the prism 21, and the terahertz wave detector 23a is disposed on the right side of the prism 21. In addition, when viewed in plan view, the terahertz wave generator 19b is disposed on the upper side of the prism 21, and the terahertz wave detector 23b is disposed on the lower side of the prism 21. Thus, a line joining the terahertz wave generator 19a and the terahertz wave detector 23a when viewed in plan view and a line joining the terahertz wave generator 19b and the terahertz wave detector 23b when viewed in plan view intersect each other and, more specifically, the lines are orthogonal to each other.

The terahertz wave generator 19a is set so as to emit only the S wave. The S wave emitted from the terahertz wave generator 19a is introduced into the prism 21 via an entrance surface 69a of the prism 21, and is applied to the sample 3. The S wave reflected at the sample 3 is emitted from an emission surface 71a of the prism 21, and is detected by the terahertz wave detector 23a.

The terahertz wave generator 19b is set so as to emit, e.g., only the P wave. The P wave emitted from the terahertz wave generator 19b is introduced into the prism 21 via an entrance surface 69b of the prism 21, and is applied to the sample 3. The line joining the terahertz wave generator 19a and the terahertz wave detector 23a when viewed in plan view and the line joining the terahertz wave generator 19b and the terahertz wave detector 23b when viewed in plan view intersect each other, and hence it is possible to apply the P wave to the same portion as the portion to which the S wave is applied. The P wave reflected at the sample 3 is emitted from an emission surface 71b of the prism 21, and is detected by the terahertz wave detector 23b.

In the modification, since the two terahertz wave generators 19a and 19b are provided, two pump light beams are required. Two optical fiber amplifiers 16 or the like may be provided and the pump light beams may be outputted from the two optical fiber amplifiers 16 or the like, or the pump light beam amplified by the optical fiber amplifier 16 or the like may also be split into two pump light beams.

In addition, in the modification, since the two terahertz wave detectors 23a and 23b are provided, two probe light beams are required. Two optical fiber amplifiers 26 or the like may be provided and the probe light beams may be outputted from the two optical fiber amplifiers 26 or the like, or the probe light beam amplified by the optical fiber amplifier 26 or the like may also be split into two probe light beams.

Further, the S wave detected by the terahertz wave detector 23a and the P wave detected by the terahertz wave detector 23b may be subjected to the sampling process at the same time, or may also be subjected to the sampling process alternately.

Figure 15A:
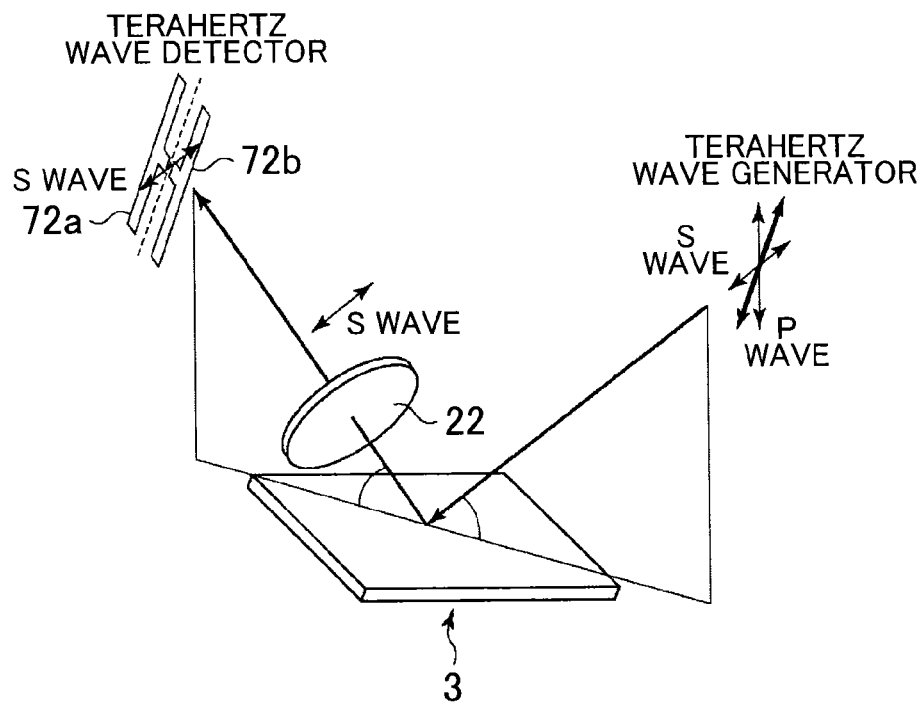
FIGS. 15A and 15B are perspective views each showing part of the film thickness measuring device according to an eighth modification of the embodiment.
Figure 15B:
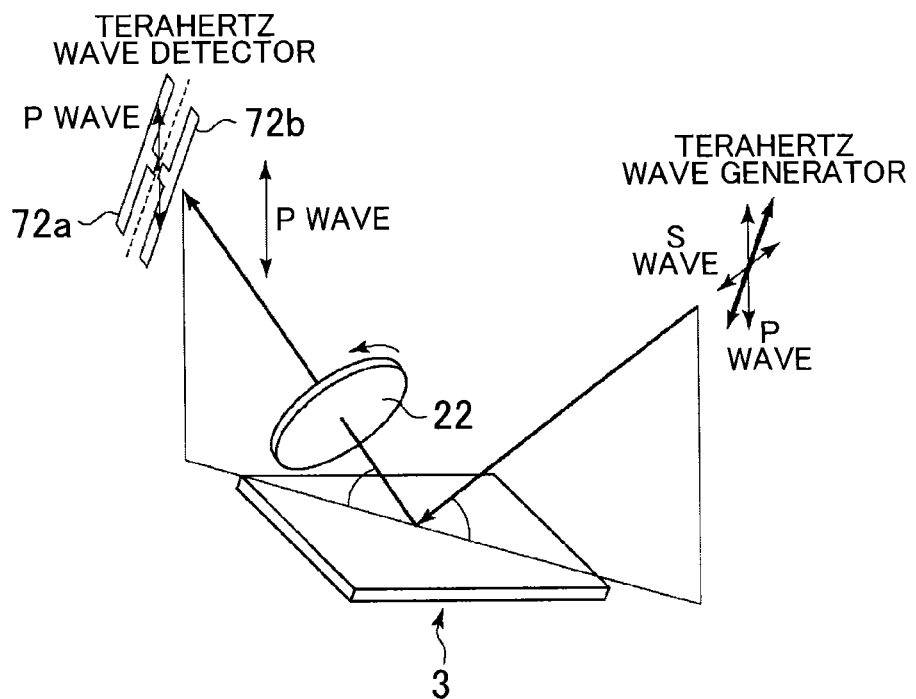

An eighth modification of the film thickness measuring device according to the embodiment will be described by using FIGS. 15A and 15B. FIGS. 15A and 15B are perspective views each showing part of the film thickness measuring device according to the modification. The depiction of the prism 21 is omitted in FIGS. 15A and 15B.

In the film thickness measuring device according to the modification, the switching between the S wave and the P wave is performed by using the polarizing plate 22 disposed between the prism 21 and the terahertz wave detector 23.

In the modification, the polarizing plate 22 is disposed between the prism 21 and the terahertz wave detector 23, but the polarizing plate 20 (see FIG. 1) is not disposed between the terahertz wave generator 19 and the prism 21. The inclination of the polarization of the terahertz wave emitted from the terahertz wave generator 19 is set to 45 degrees. The inclination of the polarization of the terahertz wave emitted from the terahertz wave generator 19 is set to 45 degrees in order to allow well-balanced application of the S wave and the P wave. In addition, in the modification, the inclinations of the dipole antennas 72a and 72b of the terahertz wave detector 23 are set to 45 degrees. The inclinations of the dipole antennas 72a and 72b of the terahertz wave detector 23 are set to 45 degrees in order to allow well-balanced detection of the S wave and the P wave.

FIG. 15A is a schematic diagram showing the case where the angle of the polarizing plate 22 is set so as to allow passage of the S wave. Since the inclination of the polarization of the terahertz wave emitted from the terahertz wave generator 19 is set to 45 degrees, the S wave and the P wave are applied to the sample 3. Since the angle of the polarizing plate 22 is set so as to allow the passage of only the S wave, among the S wave and the P wave reflected at the sample 3, only the S wave passes through the polarizing plate 22. Subsequently, the S wave having passed through the polarizing plate 22 reaches the pair of the dipole antennas 72a and 72b of the terahertz wave detector 23. Consequently, among the S wave and the P wave reflected at the sample 3, the terahertz wave detector 23 detects only the S wave.

FIG. 15B is a schematic diagram showing the case where the angle of the polarizing plate 22 is set so as to allow the passage of the P wave. When the polarizing plate 22 is rotated by 90 degrees in the state of FIG. 15A, it is possible to set the polarizing plate 22 such that the passage of only the P wave is allowed. Note that it is possible to rotate the polarizing plate 22 by using, e.g., an actuator (not shown). Since the inclination of the polarization of the terahertz wave emitted from the terahertz wave generator 19 is set to 45 degrees, the S wave and the P wave are applied to the sample 3. Since the angle of the polarizing plate 22 is set so as to allow the passage of only the P wave, among the S wave and the P wave reflected at the sample 3, only the P wave passes through the polarizing plate 22. Subsequently, the P wave having passed through the polarizing plate 22 reaches the pair of the dipole antennas 72*a* and 72*b* of the terahertz wave detector 23. Consequently, among the S wave and the P wave reflected at the sample 3, the terahertz wave detector 23 detects only the P wave.

Note that, in the modification, the switching between the S wave and the P wave is performed by rotating the polarizing plate 22, but the modification is not limited thereto. The polarizing plate may also be switched between the polarizing plate that allows the passage of only the S wave and the polarizing plate that allows the passage of only the P wave. It is possible to perform the switching between the polarizing plate that allows the passage of only the S wave and the polarizing plate that allows the passage of only the P wave by using, e.g., an actuator (not shown). It is possible to control the actuator by, e.g., the control device 6.

Thus, according to the modification as well, it is possible to detect the S wave and the P wave.

A ninth modification of the film thickness measuring device according to the embodiment will be described by using FIG. 16. FIG. 16 is a plan view showing part of the film thickness measuring device according to the modification.

In the film thickness measuring device according to the modification, the terahertz wave including the S wave and the P wave is outputted from the terahertz wave generator 19, and the S wave is detected by the terahertz wave detector 23*a* and the P wave is detected by the terahertz wave detector 23*b* different from the terahertz wave detector 23*a*. The inclination of the polarization of the terahertz wave emitted from the terahertz wave generator 19 is set to, e.g., 45 degrees. The inclination of the polarization of the terahertz wave emitted from the terahertz wave generator 19 is set to 45 degrees in order to allow well-balanced application of the S wave and the P wave. In the modification, the polarizing plate 20 (see FIG. 1) is not disposed between the terahertz wave generator 19 and the prism 21. A polarizing plate 22*a* is disposed at the subsequent stage of the prism 21. The polarizing plate 22*a* is capable of separating the S wave and the P wave from each other.

Since the S wave and the P wave are included in the terahertz wave outputted from the terahertz wave generator 19, the S wave and the P wave are applied to the sample 3. The terahertz wave including the S wave and the P wave reflected at the sample 3 is outputted via the emission surface 71 of the prism 21, and is split into the S wave and the P wave by the polarizing plate 22*a*. The S wave obtained by the splitting by the polarizing plate 22*a* is detected by the terahertz wave detector 23*a*. On the other hand, the P wave obtained by the splitting by the polarizing plate 22*a* is detected by the terahertz wave detector 23*b*.

In addition, in the modification, since the two terahertz wave detectors 23*a* and 23*b* are provided, two probe light beams are required. Two optical fiber amplifiers 26 or the like may be provided and the probe light beams may be outputted from the two optical fiber amplifiers 26 or the like, or the probe light beam amplified by the optical fiber amplifier 26 or the like may be split into two probe light beams.

Further, the S wave detected by the terahertz wave detector 23*a* and the P wave detected by the terahertz wave detector 23*b* may be subjected to the sampling process at the same time, or may also be subjected to the sampling process alternately.

Thus, according to the modification as well, it is possible to detect the S wave and the P wave.

The modification is not limited to the above embodiment, and various modifications may be made.

Figure 17:
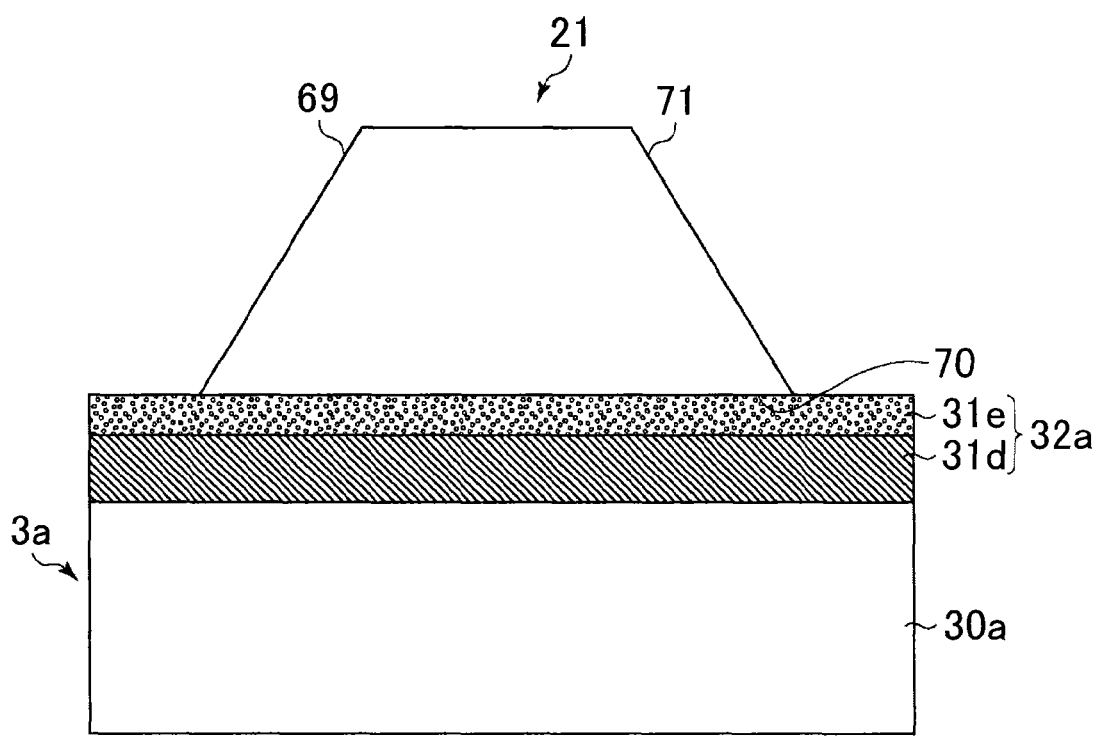
FIG. 17 is a sectional view showing a sample in another example of the embodiment.

For example, in the above embodiment, the description has been given by taking the case where the film 31*b* that causes the dispersion or absorption of the terahertz wave is the film containing the conductive particle (metal particle, metal powder) as an example, but the embodiment is not limited thereto. For example, the dispersion or absorption of the terahertz wave occurs also in a film containing a pore. An example of the film containing the pore includes a porous film or the like. More specifically, the example thereof includes a porous ceramic layer or the like. Examples of the material of the porous ceramic film include zirconium oxide (ZrO2) and aluminum oxide (Al2O3). It is possible to form the porous ceramic layer on a base material by, e.g., thermal spraying or the like. FIG. 17 is a sectional view showing the sample in another example of the embodiment of the invention. As shown in FIG. 17, a film 31*d* as the first layer is formed on a base material 30*a*, and a film 31*e* as the second layer that contains the pore is formed on the film 30*d* as the first layer. An example of the material of the base material 30*a* includes, e.g., a resin or the like. An example of the material of the film 31*d* as the first layer includes a resin or the like. The film 31*e* as the second layer is the film containing the pore. More specifically, an example of the film 31*e* as the second layer includes the porous ceramic film or the like. The film 31*d* as the first layer and the film 31*e* as the second film constitute a multi-layer film 32*a*. Note that the description has been given by taking the case where the multi-layer film 32*a* formed on the base material 30*a* has a two-layer structure as an example, but the structure of the multi-layer film 32*a* is not limited to the two-layer structure. The invention can be applied also to the case where the film 31*b* that causes the dispersion or absorption of the terahertz wave is included in the multi-layer film having three or more layers. Note that the description has been given by taking the case where the material of the base material 30*a* is the resin as an example, but the material of the base material 30*a* is not limited to the resin. In addition, the description has been given by taking the case where the material of the film 31*d* as the first layer is the resin as an example, but the material of the film 31*d* as the first layer is not limited to the resin. Thus, the film 31*d* that causes the dispersion or absorption of the terahertz wave may be the film containing the pore.

In addition, in the above embodiment, the description has been given by taking the case where the relationship between the time difference T3 and the thickness of the film 31*a* as the first layer is measured in advance by using the sample specimen, and the thickness of the film 31*a* as the first layer in the sample 3 is determined based on the relationship that has been measured in advance as an example, but the embodiment is not limited thereto. For example, the thickness of the film 31*a* as the first layer may also be determined by performing a calculation or the like on a difference between the time waveform (behavior) of the S-polarization component and the time waveform (behavior) of the P-polarization component.

Further, in the above embodiment, the description has been given by taking the case where the thickness of the film 31*b* as the second layer is determined based on the peak of the time waveform obtained by the second deconvolution filter process as an example, but the embodiment is not limited thereto. For example, the thickness of the film 31*b* as the second layer may also be determined based on the peak of the time waveform obtained by the first deconvolution filter process.

Furthermore, in the above embodiment, the description has been given by taking the case where the thickness of each of the films 31a to 31c of the multi-layer film 32 having the three-layer structure is measured as an example, but the embodiment is not limited thereto. The invention can also be applied to the case where the thickness of each of the films of the multi-layer film having the two-layer structure is measured. For example, even in the case where the dispersion or absorption of the terahertz wave occurs in the film as the second layer in the multi-layer film having the two-layer structure, it is possible to accurately measure the thickness of the film as the first layer. In addition, the invention can be applied also to the case where the thickness of each of the films of the multi-layer film having four or more layers is measured.

Moreover, in the above embodiment, the description has been given by taking the case where the number of layers of the metallic base layer 31b is one as an example, but the embodiment is not limited thereto. A plurality of the metallic base layers 31b may be formed. That is, a plurality of the films 31b that cause the dispersion or absorption of the terahertz wave may be formed. For example, one or more metallic base layers may be further formed between the metallic base layer 31b and the clear layer 31c in FIG. 1.

Additionally, in the above embodiment, the description has been given by taking the case where the number of layers of the clear layers 31c is one as an example, but the embodiment is not limited thereto. A plurality of the clear layers 31c may be formed. For example, one or more clear layers may be formed on the clear layer 31c in FIG. 1.

In addition, in the above embodiment, the description has been given by taking the case where the clear layer 31c is formed as an example, but the clear layer 31c may not be formed.

What is claimed is:

1. A film thickness measuring device comprising:
    a terahertz wave generator that generates a terahertz wave;
    a prism that has an entrance surface through which the terahertz wave emitted from the terahertz wave generator is caused to enter, an abutment surface capable of abutting a surface of a sample including a first film, and an emission surface from which a reflected wave from the sample is emitted;
    a terahertz wave detector that detects an S-polarization component and a P-polarization component of the reflected wave emitted from the emission surface of the prism; and
    a control section configured to determine a thickness of the first film formed in the sample, based on a difference between a time waveform of the S-polarization component of the reflected wave and a time waveform of the P-polarization component of the reflected wave, wherein
    the sample further includes a second film that is formed on the first film and contains one of a conductive particle and a pore,
    the sample further includes a third film formed on the second film,
    an incident angle of the terahertz wave at an interface between the abutment surface and the third film is set to a value that is smaller than a critical angle such that total reflection of the terahertz wave does not occur,
    an angle of the entrance surface is set such that an optical axis of the terahertz wave caused to enter through the entrance surface is directed in a direction of a normal to the entrance surface, and
    an angle of the emission surface is set such that an optical axis of a reflected wave reflected at an interface between the prism and the third film is directed in a direction of a normal to the emission surface.

2. The film thickness measuring device according to claim 1, wherein:
    the control section is configured to determine a thickness of the second film based on a peak in a time waveform obtained by performing a deconvolution process on one of time waveform data on the S-polarization component of the reflected wave and time waveform data on the P-polarization component of the reflected wave by using a first window function; and
    the control section is configured to determine the thickness of the first film based on a difference between the time waveform of the S-polarization component obtained by performing the deconvolution process on the time waveform data on the S-polarization component of the reflected wave by using a second window function different from the first window function and the time waveform of the P-polarization component obtained by performing the deconvolution process on the time waveform data on the P-polarization component of the reflected wave by using the second window function.

3. The film thickness measuring device according to claim 1, wherein:
    the control section is configured to determine a thickness of the third film based on a peak in a time waveform obtained by performing a deconvolution process on one of time waveform data on the S-polarization component of the reflected wave and time waveform data on the P-polarization component of the reflected wave by using a first window function; and
    the control section is configured to determine the thickness of the first film based on a difference between the time waveform of the S-polarization component obtained by performing the deconvolution process on the time waveform data on the S-polarization component of the reflected wave by using a second window function different from the first window function and the time waveform of the P-polarization component obtained by performing the deconvolution process on the time waveform data on the P-polarization component of the reflected wave by using the second window function.

4. The film thickness measuring device according to claim 1, wherein the second film is a metallic base layer.

5. The film thickness measuring device according to claim 1, wherein the third film is a clear layer.

6. The film thickness measuring device according to claim 1, wherein the first film is a conductive primer layer.

7. The film thickness measuring device according to claim 1, wherein the second film is a porous ceramic layer.

8. The film thickness measuring device according to claim 1, wherein the prism includes a refractive index matching member.

9. A film thickness measuring method comprising:
    causing an abutment surface of a prism to abut a surface of a sample, the sample including a first film, a second film formed on the first film and containing one of a conductive particle and a pore, and a third film formed on the second film, and the prism having an entrance surface through which a terahertz wave emitted from a terahertz wave generator is caused to enter, the abutment surface, and an emission surface from which a reflected wave from the sample is emitted;

setting an incident angle of the terahertz wave at an interface between the abutment surface and the third film to a value that is smaller than a critical angle such that total reflection of the terahertz wave does not occur;

detecting an S-polarization component and a P-polarization component of the reflected wave emitted from the emission surface of the prism using a terahertz wave detector; and determining a thickness of the first film formed in the sample, based on a difference between a time waveform of the S-polarization component of the reflected wave and a time waveform of the P-polarization component of the reflected wave, wherein an angle of the entrance surface is set such that an optical axis of the terahertz wave caused to enter through the entrance surface is directed in a direction of a normal to the entrance surface, and an angle of the emission surface is set such that an optical axis of a reflected wave reflected at an interface between the prism and the third film is directed in a direction of a normal to the emission surface.

* * * * *